US011358702B2

(12) United States Patent
Prendergast et al.

(10) Patent No.: US 11,358,702 B2
(45) Date of Patent: Jun. 14, 2022

(54) AIRCRAFT SECURITY DOOR AND METHOD AND APPARATUS FOR SECURITY DOOR HANDLING

(71) Applicant: THE BOEING COMPANY, Chicago, IL (US)

(72) Inventors: Matthew L. Prendergast, Covington, WA (US); Nicholas J. Brimlow, Sammamish, WA (US); Arthur E. Whitson, Jr., Seattle, WA (US); Ryan J. O'Connor, Seattle, WA (US); Gregory W. Swanson, Burien, WA (US)

(73) Assignee: THE BOEING COMPANY, Chicago, IL (US)

( * ) Notice: Subject to any disclaimer, the term of this patent is extended or adjusted under 35 U.S.C. 154(b) by 329 days.

(21) Appl. No.: 16/245,800

(22) Filed: Jan. 11, 2019

(65) Prior Publication Data

US 2020/0223526 A1   Jul. 16, 2020

(51) Int. Cl.
*B64C 1/14* (2006.01)
*B64F 1/30* (2006.01)
*B64F 5/10* (2017.01)
*B64F 5/50* (2017.01)

(52) U.S. Cl.
CPC .............. *B64C 1/1461* (2013.01); *B64F 1/30* (2013.01); *B64F 5/10* (2017.01); *B64F 5/50* (2017.01)

(58) Field of Classification Search
CPC .... B64D 45/0028; B64D 9/00; B64C 1/1423; B64C 1/22; B64C 1/1469; B64C 1/1461; B64F 1/30
See application file for complete search history.

(56) References Cited

U.S. PATENT DOCUMENTS

| | | | | |
|---|---|---|---|---|
| 3,581,331 A * | 6/1971 | Fisher | .................. | B64F 1/3055 |
| | | | | 14/71.5 |
| 4,944,473 A * | 7/1990 | Kallies | .................. | B64C 1/1407 |
| | | | | 244/129.5 |
| 5,064,147 A * | 11/1991 | Noble | .................... | B64C 1/143 |
| | | | | 244/129.5 |
| 8,157,214 B2 * | 4/2012 | Schwarz | ............... | B64C 1/1484 |
| | | | | 244/129.3 |
| 8,434,720 B2 * | 5/2013 | Depeige | ............... | B64C 1/1407 |
| | | | | 244/129.5 |
| 9,663,217 B1 * | 5/2017 | Da Silva | ............... | B64C 1/1407 |
| 2003/0192989 A1 * | 10/2003 | Owen | .................. | B64C 1/1469 |
| | | | | 244/118.5 |
| 2007/0007390 A1 * | 1/2007 | Doerer | .................. | B64C 1/1423 |
| | | | | 244/129.5 |

(Continued)

*Primary Examiner* — Richard R. Green
*Assistant Examiner* — Ashesh Dangol
(74) *Attorney, Agent, or Firm* — Patterson + Sheridan, LLP

(57) ABSTRACT

The present disclosure provides an aircraft security door as well as methods, systems and apparatus for handling an aircraft security door. In one implementation, a method for installing an aircraft security door onto an aircraft is disclosed. The method includes transferring the aircraft security door to an aircraft service stair, supporting the aircraft security door by a bridge crane coupled to the aircraft service stair, positioning the aircraft service stair in proximity to a fuselage of the aircraft adjacent to an opening in the fuselage, positioning the aircraft security door relative to the opening using the bridge crane, and securing the aircraft security door to the opening.

26 Claims, 27 Drawing Sheets

(56) References Cited

U.S. PATENT DOCUMENTS

| | | | |
|---|---|---|---|
| 2007/0199188 A1* | 8/2007 | Barker | B64C 1/1446 |
| | | | 29/33.2 |
| 2015/0298789 A1* | 10/2015 | Robert | E05B 35/008 |
| | | | 292/194 |
| 2016/0270527 A1* | 9/2016 | Winter | B62B 5/00 |
| 2019/0078351 A1* | 3/2019 | Marsden | E05B 13/002 |

* cited by examiner

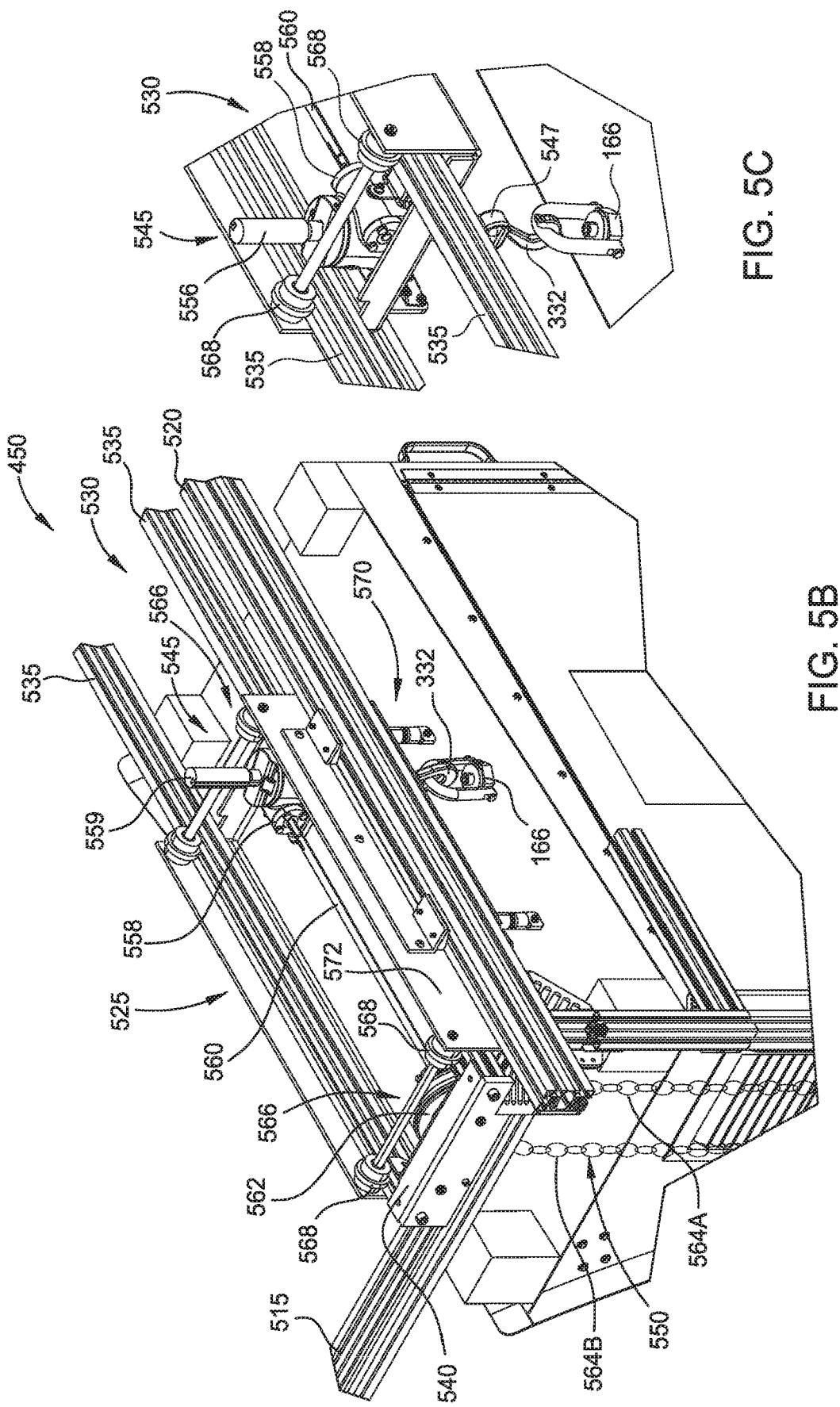

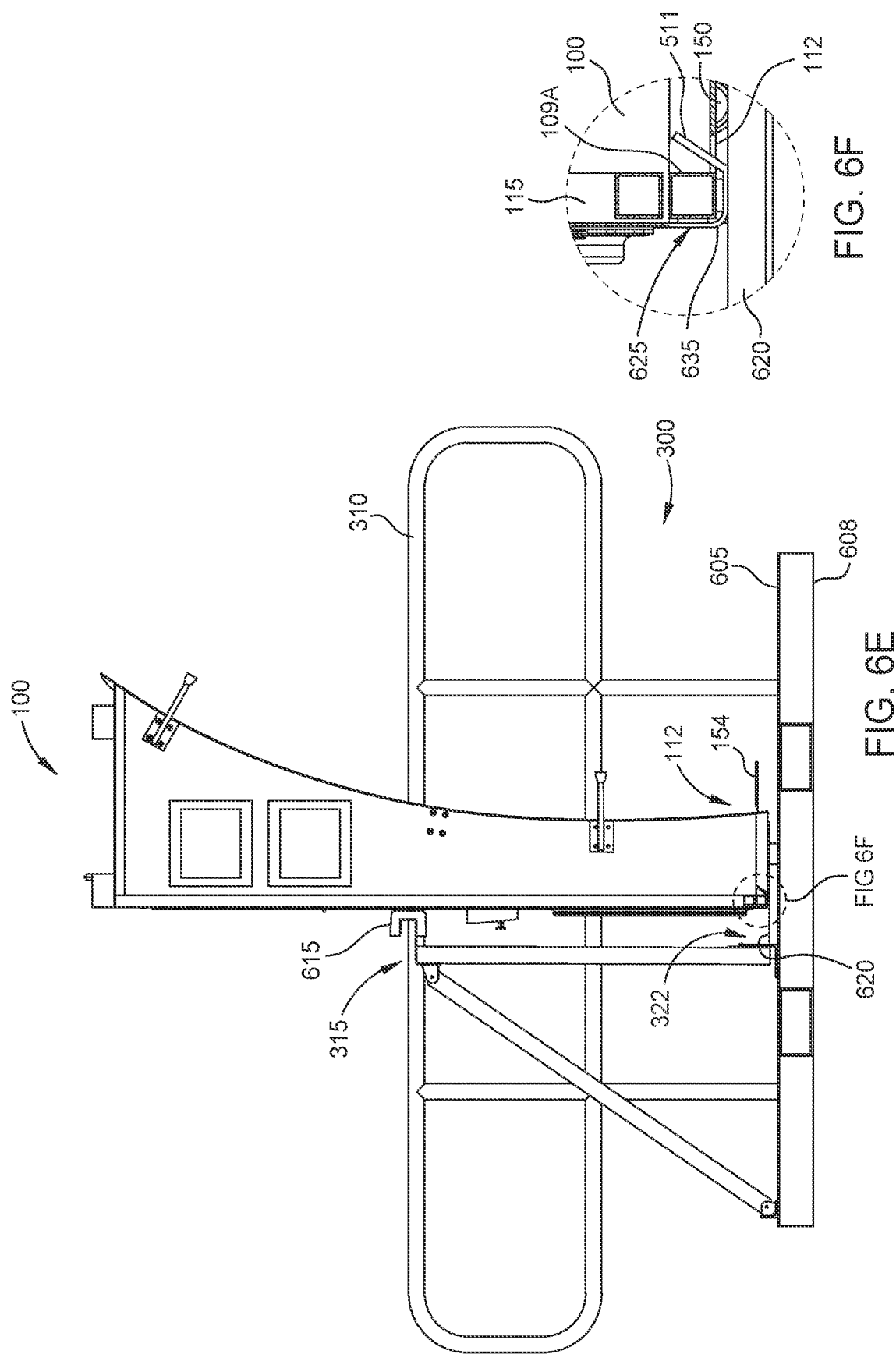

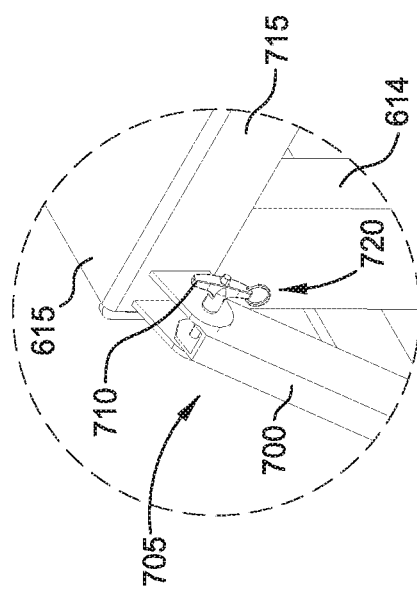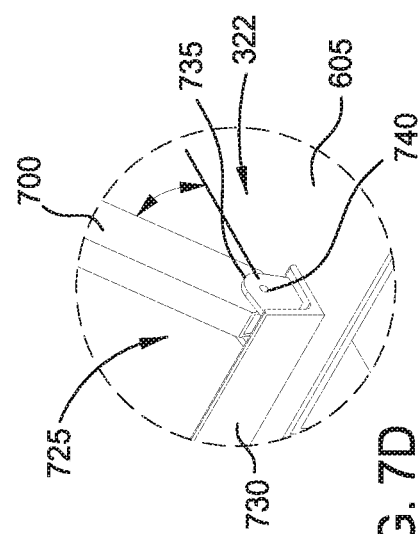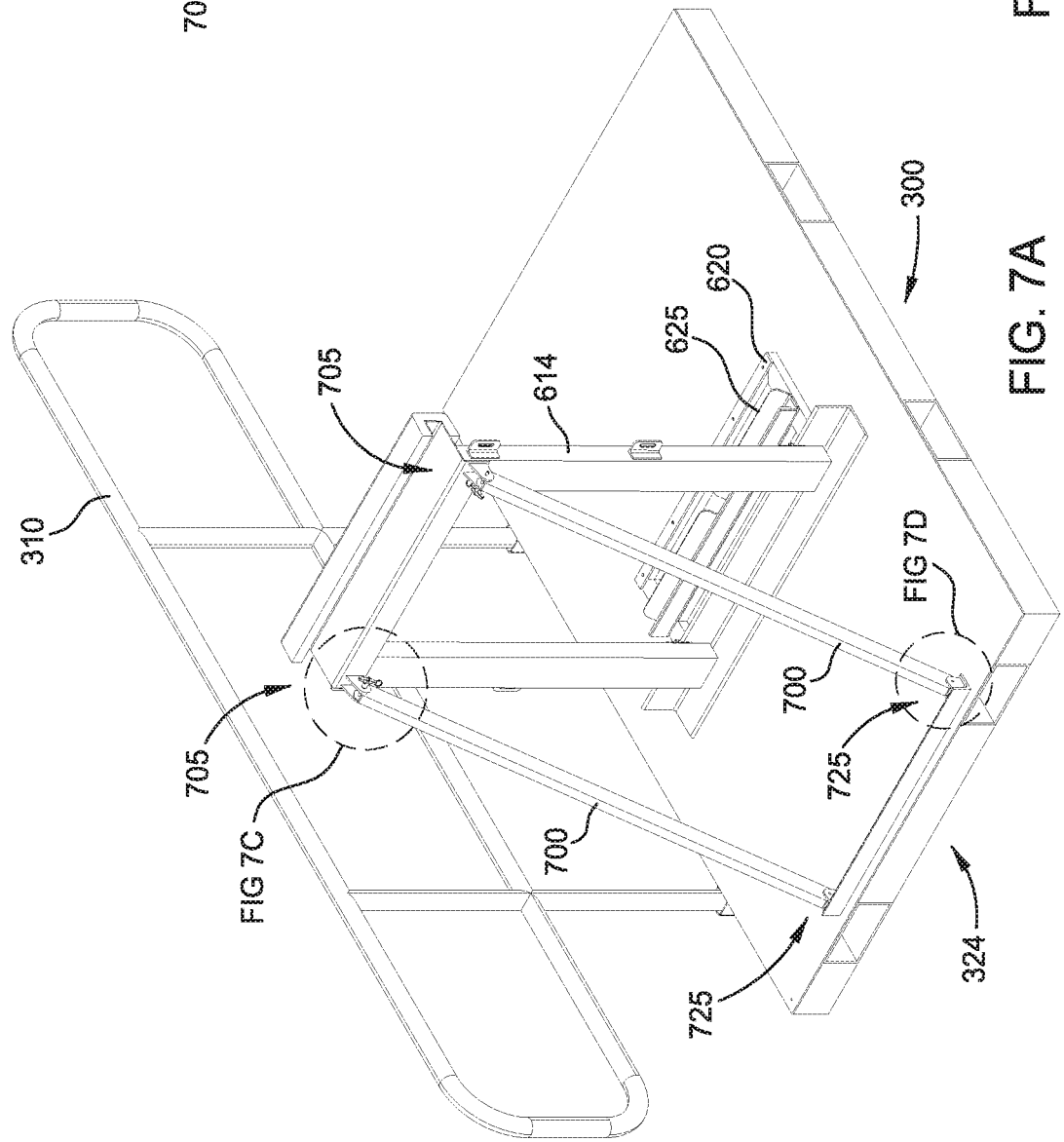

AIRCRAFT SECURITY DOOR AND METHOD AND APPARATUS FOR SECURITY DOOR HANDLING

FIELD

Aspects of the present disclosure provide a method and apparatus for transfer of objects to and from an aircraft. More specifically, implementations disclosed herein relate to an aircraft security door as well as handling an aircraft security door.

BACKGROUND

The present disclosure relates to an aircraft security door, and more specifically, to methods and apparatus for handling an aircraft security door. Aspects of the disclosure may also be applicable to moving other objects to and from an aircraft with improved safety.

Whenever there is a need to load or unload parts or equipment to or from an aircraft, the item is typically carried by hand up or down a stairway, often referred to as an aircraft service stair, or the item is lifted to the aircraft directly by a forklift and pallet or other means.

Conventionally, aircraft security doors, which are utilized during servicing of aircraft, are lifted using a pallet and forklift to the platform of the aircraft service stair. The security door is laid down on the pallet which is lifted to the platform, and personnel then move the security door from the pallet onto the platform. The security door typically has a weight that is greater than about 180 pounds, which typically requires more than one person to transfer the door from the pallet to the platform.

This method of transfer introduces numerous difficulties, due to, for example, reduced space on the platform, and the weight of the doors. Further, laying the door down on the pallet and/or moving the door from the pallet to the platform may damage the door.

SUMMARY

The present disclosure provides an aircraft security door as well as methods and apparatus for handling an aircraft security door.

In one implementation, an aircraft security door is disclosed that includes a frame, a door panel coupled to the frame, the door panel surrounded by a first jamb and a second jamb, wherein the door panel includes a vent and a transparent window coverable by a sliding member. The aircraft security door also includes respective side portions coupled to each of the first jamb and the second jamb, each side portion extending in a lateral direction away from the door panel, one or more tamper evident locks coupled to the door panel, and an arc-shaped member coupled to each side portion along a height of the frame.

In another implementation, an aircraft security door is disclosed that includes a frame including a base portion and a roof portion, wherein the roof portion includes a slanted roof panel, a door panel coupled to the frame, the door panel surrounded by a first jamb and a second jamb, wherein the door panel includes a vent and a transparent window coverable by a sliding member. The aircraft security door also includes respective side portions coupled to each of the first jamb and the second jamb, each side portion extending in a lateral direction away from the door panel, one or more tamper evident locks coupled to the door panel, and an arc-shaped member coupled to each side portion along a height of the frame.

In another implementation, a method for installing an aircraft security door onto an aircraft is disclosed. The method includes transferring the aircraft security door to an aircraft service stair, supporting the aircraft security door by a bridge crane coupled to the aircraft service stair, positioning the aircraft service stair in proximity to a fuselage of the aircraft adjacent to an opening in the fuselage, positioning the aircraft security door relative to the opening using the bridge crane, and securing the aircraft security door to the opening.

In another implementation, a pallet for supporting an aircraft security door is disclosed that includes a base member that includes two short sides on opposing ends thereof and two long sides adjacent to the two short sides, a first railing positioned on one of the long sides along a length thereof, and a second railing comprising a folding structure positioned on a top plate of the base member, the second railing being foldable in a transverse direction relative to a length of the long sides of the base member.

In another implementation, a pallet for supporting an aircraft security door is disclosed that includes a base member that includes two short sides on opposing ends thereof and two long sides adjacent to the two short sides, a first railing positioned on one of the long sides along a length thereof, a second railing comprising a folding structure positioned on a top plate of the base member, the second railing being foldable in a transverse direction relative to a length of the long sides of the base member, and a raised support member coupled to the top plate adjacent to the second railing.

In another implementation, a method for installing an aircraft security door onto an aircraft is disclosed that includes transferring the aircraft security door to an aircraft service stair on a pallet, supporting the aircraft security door by a bridge crane coupled to the aircraft service stair, removing the pallet from the aircraft service stair, positioning the aircraft service stair in proximity to a fuselage of the aircraft adjacent to an opening in the fuselage, positioning the aircraft security door relative to the opening using the bridge crane, and securing the aircraft security door to the opening.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings.

FIG. 5B is an enlarged perspective view of the trolley of the bridge crane of FIG. 5A.

FIG. 5C is an enlarged perspective view of the trolley frame of the bridge crane of FIG. 5A.

FIG. 6E is a sectional view of the transport pallet and the aircraft security door along lines 6E-6E of FIG. 6D.

FIG. 6F is an enlarged view of a portion of the transport pallet and the aircraft security door shown in FIG. 6E.

FIGS. 7A and 7B are perspective views of the transport pallet showing operation of the folding structure. In FIG. 7A, the folding structure is in an upright position to support the aircraft security door (not shown) and the folding structure is shown in a stowed position in FIG. 7B.

FIGS. 7C-7D are enlarged views of portions of the second railing showing coupling interfaces of the folding structure.

DETAILED DESCRIPTION

The present disclosure provides an aircraft security door as well as methods, systems and apparatus for improved handling of an aircraft security door.

FIGS. 1A-1G are various views of an aircraft security door 100. The aircraft security door 100 is utilized to temporarily couple to a fuselage of an aircraft (not shown) to provide ingress and egress to the aircraft during servicing of the aircraft in lieu of utilizing the flight door of the aircraft. For example, when servicing the aircraft, service personnel enter and exit the aircraft multiple times. Aircraft flight doors are expensive to maintain and replace and opening and closing the flight door damages components on the flight door, such as seals and/or latches. Damage to these components reduces the lifetime of the flight door. However, utilizing the aircraft security door 100 as described herein, a comfortable atmosphere can be maintained in the aircraft during servicing while allowing ease of entry and exit to service personnel. For example, while the aircraft security door 100 is not pressurizable like the flight door, climate controls on the aircraft can be utilized to heat or cool the aircraft during servicing with minimal thermal losses through the aircraft security door 100. In addition, security of the aircraft being serviced is maintained utilizing the aircraft security door 100 as described herein.

Figure 1A:
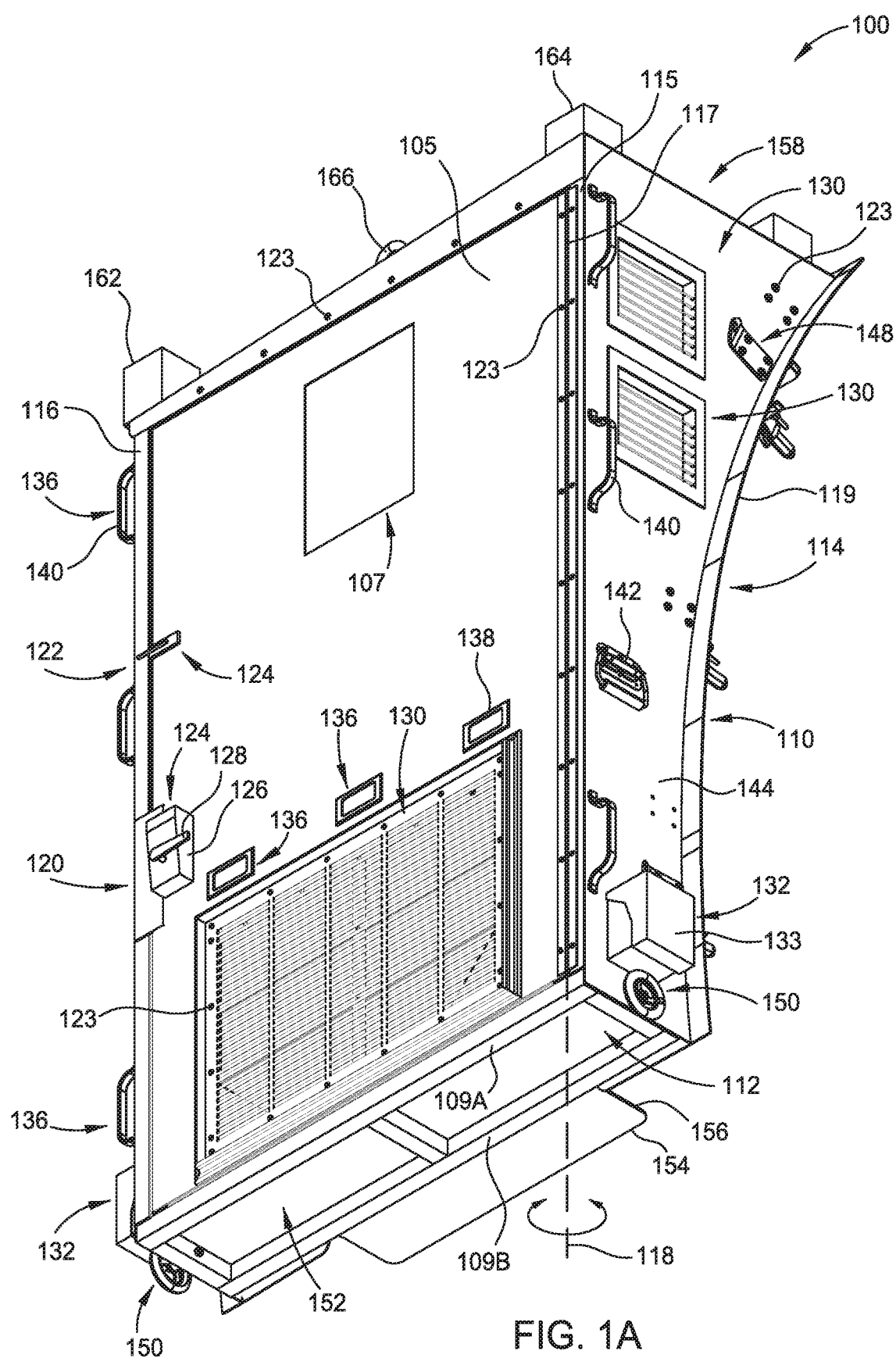
FIGS. 1A-1G are various views of an aircraft security door.
Figure 1B:
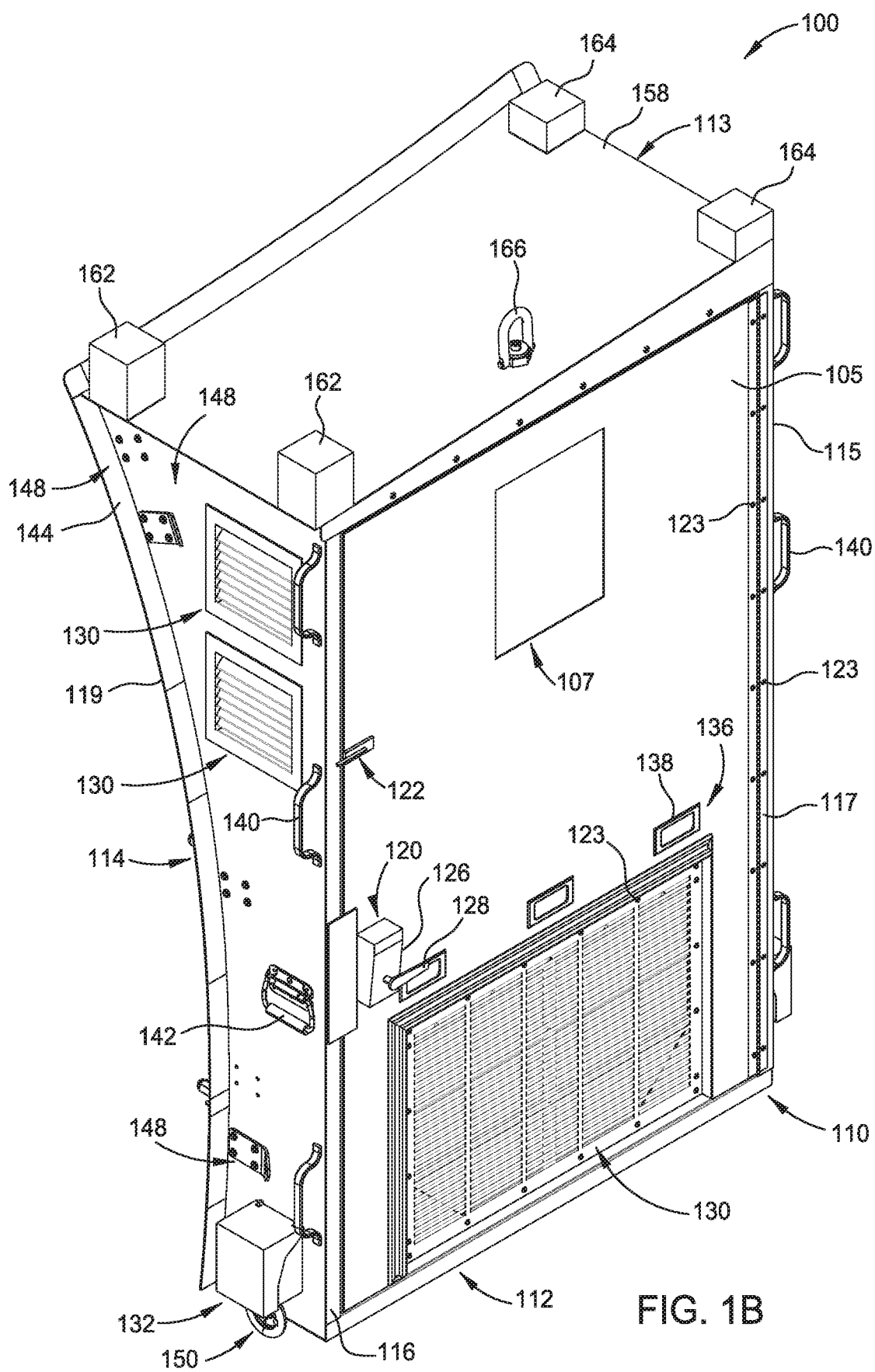
Figure 1C:
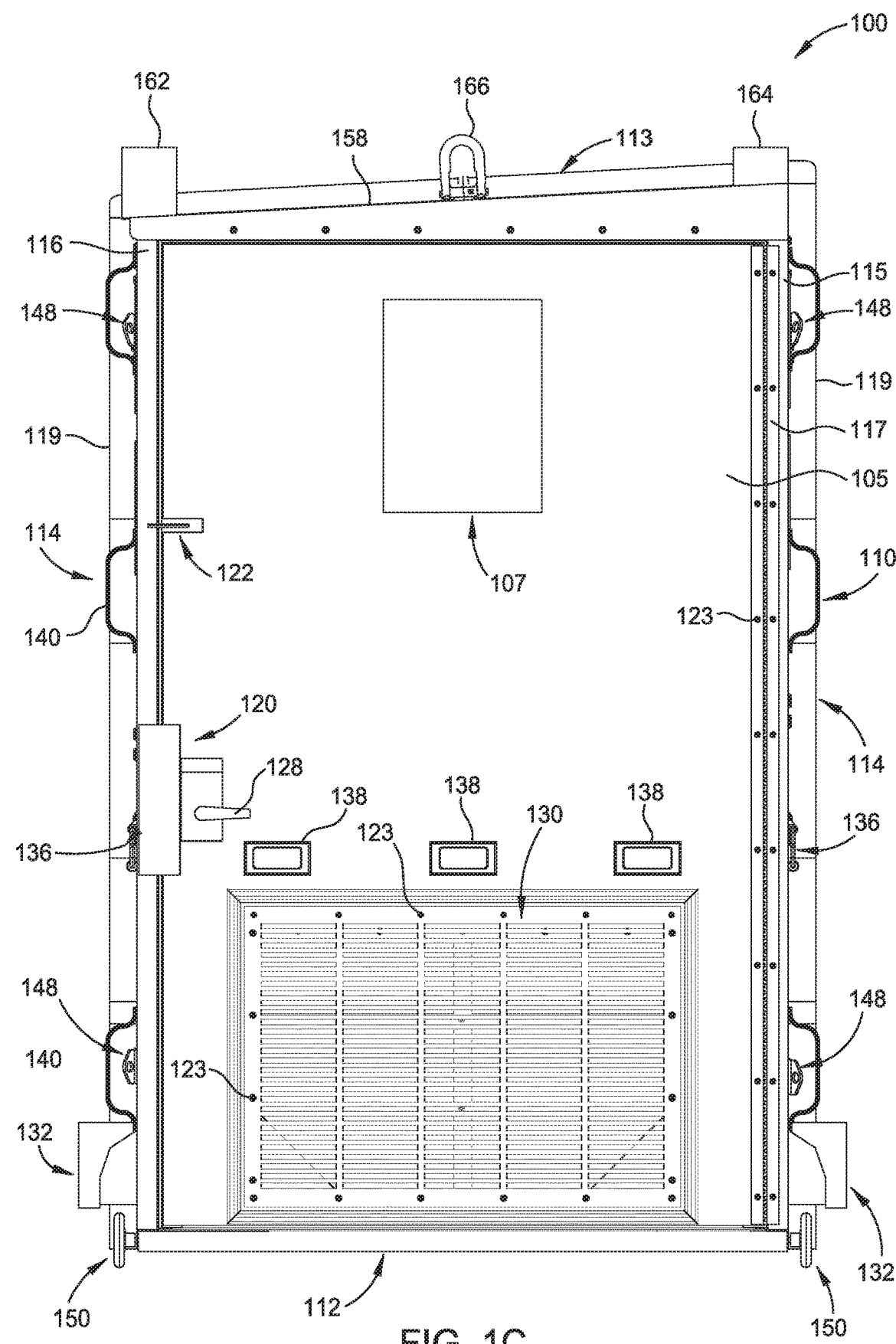
Figure 1D:
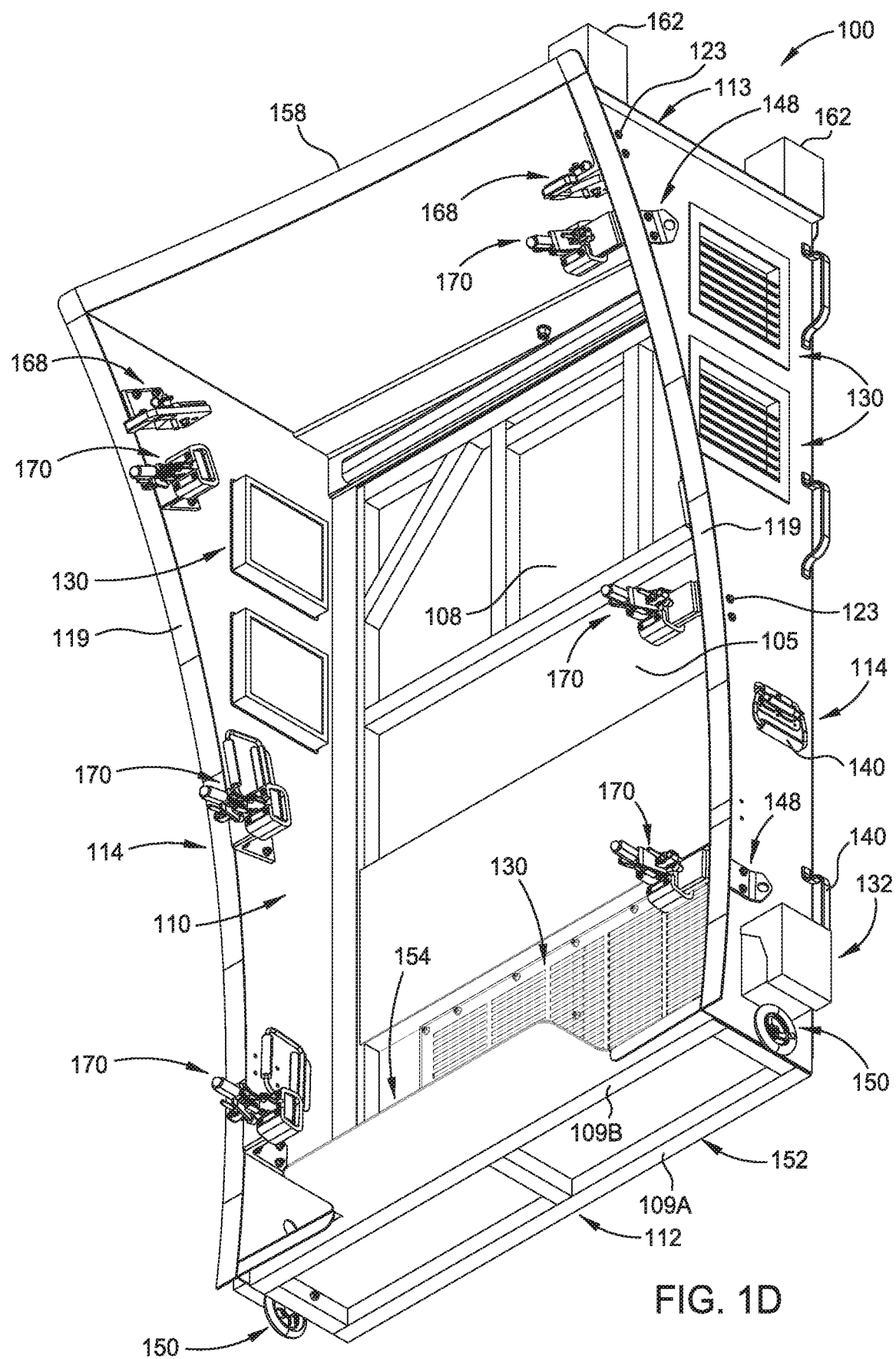
Figure 1E:
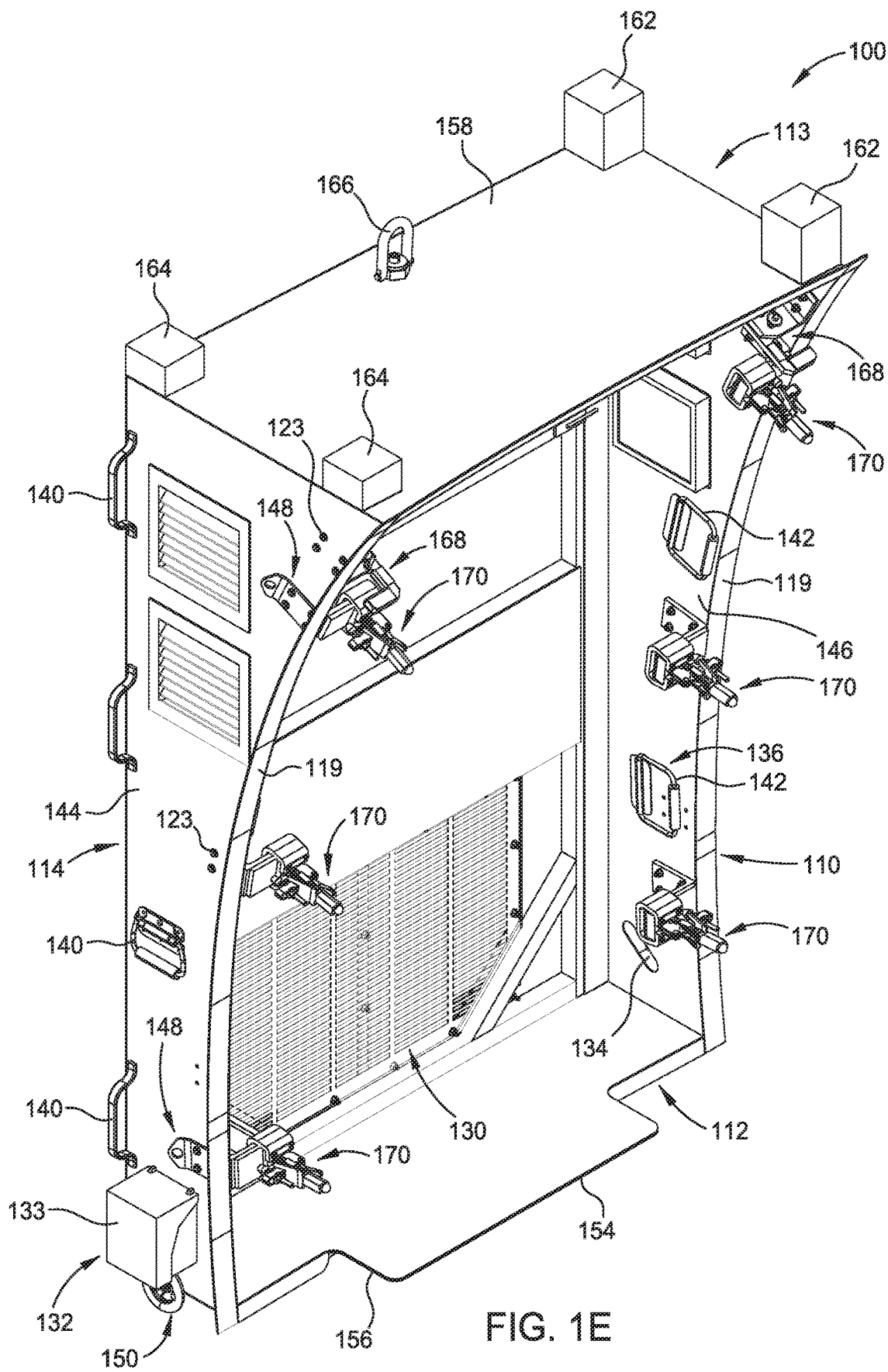
Figure 1F:
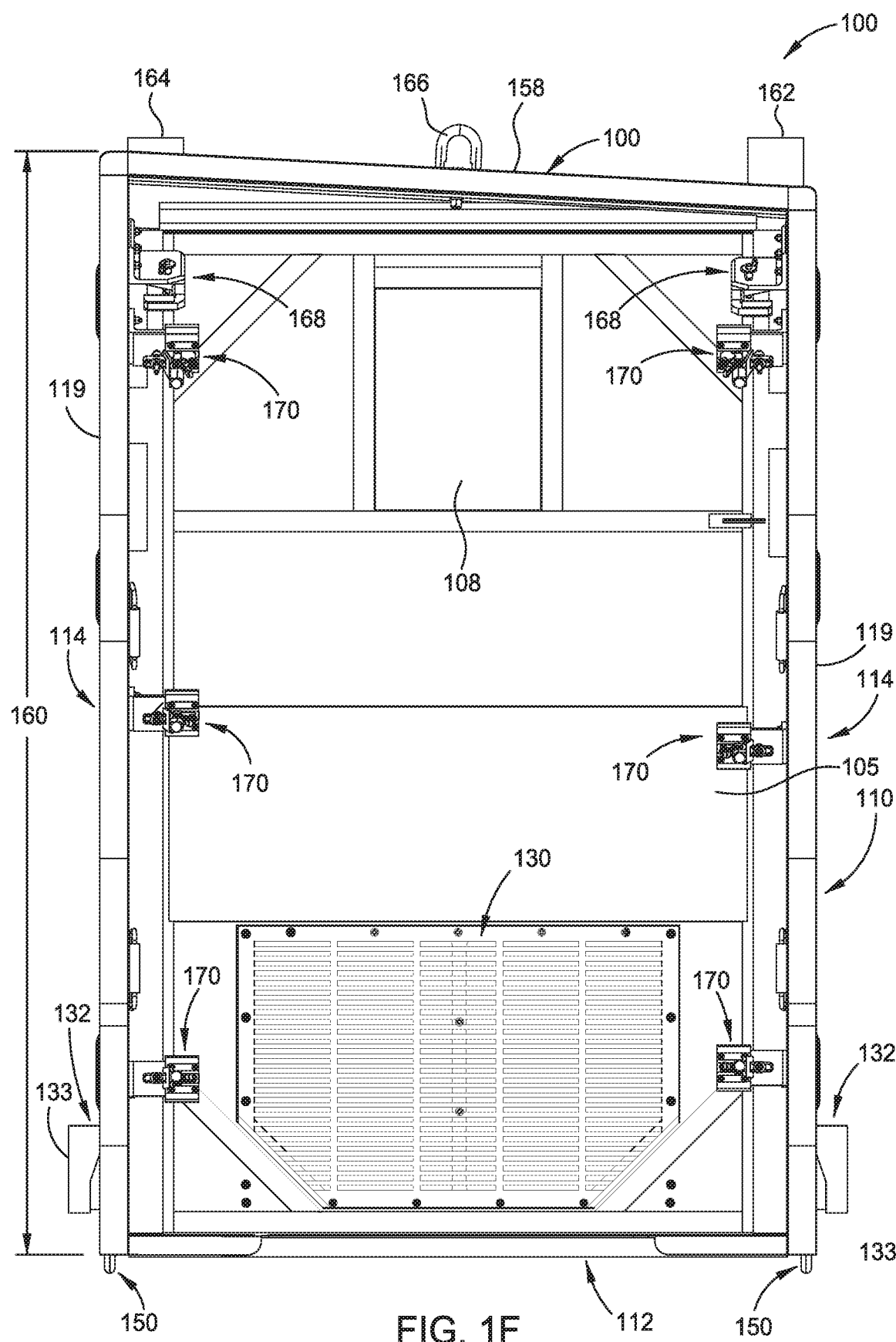
Figure 1G:
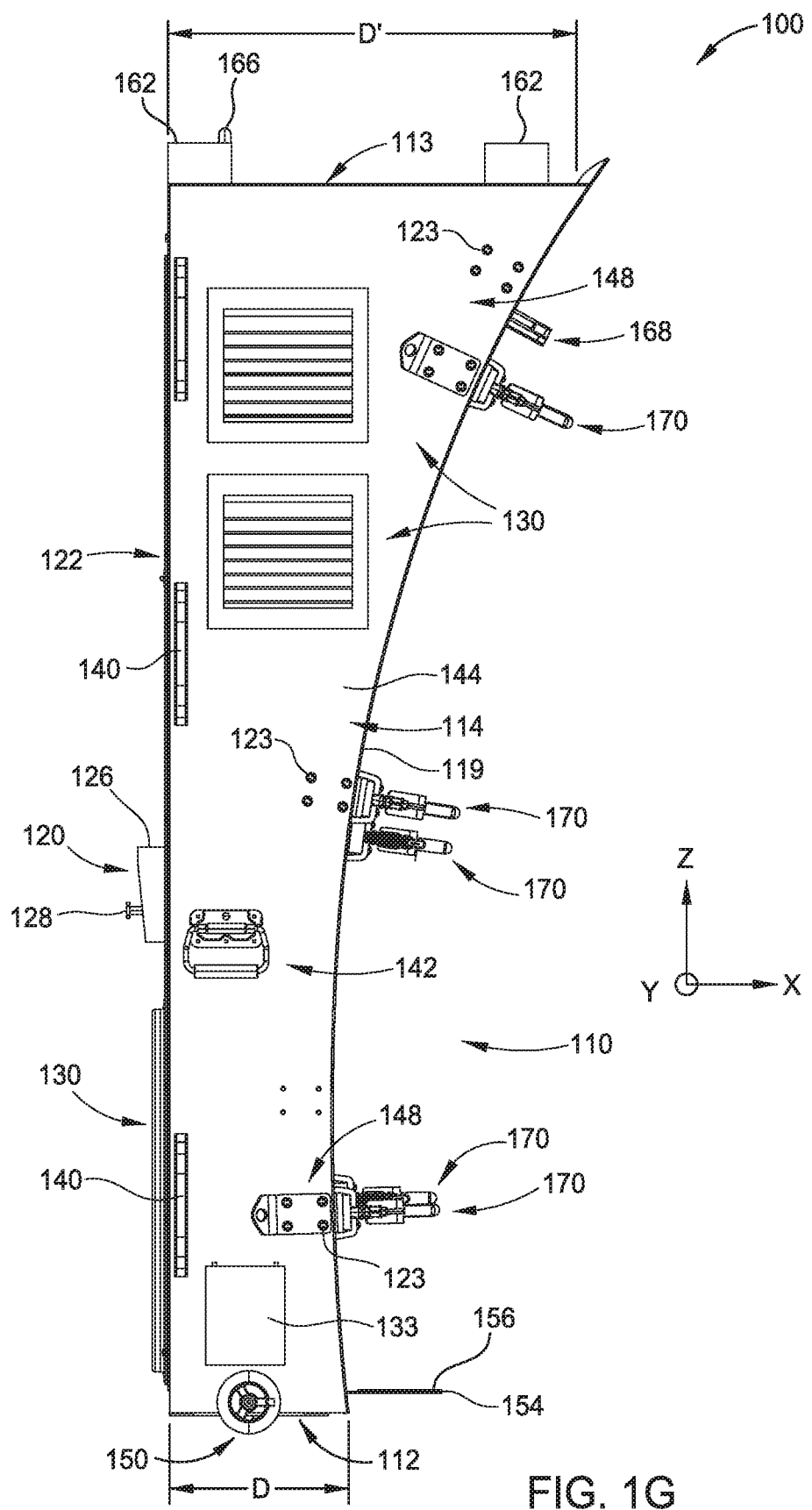

The aircraft security door 100 includes a door panel 105 that is hingedly coupled to a frame 110. The frame 110 is a multi-component assembly that includes a base portion 112, a roof portion 113, and side portions 114 on each side of the base portion 112 and the roof portion 113. The base portion 112 includes a plurality of tubular members 109A and 109B aligned along a width of the aircraft security door 100. As shown in FIG. 1G, the base portion 112 extends along a lateral direction (a Y-X plane) a first depth D, and the roof portion extends along the lateral direction a second depth D', with the second depth D' being greater than the first depth D. Each of the side portions 114 includes a jamb, such as a first jamb 115 and a second jamb 116 positioned on opposing sides of the door panel 105. Each of the first jamb 115 and the second jamb 116 are coupled to the tubular member 109A. Each of the side portions 114 includes an arc-shaped member 119. The arc-shaped member 119 is curved to match a contour of an aircraft fuselage (not shown). For example, the arc-shaped member 119 includes a concave shape that substantially matches a convex shape of the fuselage. A water/pressure tight seal (not shown) is provided between the arc-shaped member 119 and the fuselage when the aircraft security door 100 is installed. The arc-shaped member 119 of the aircraft security door 100 is sized to accommodate both wide-body and narrow-body aircraft. The door panel 105 includes a sliding member 107 that opens and closes relative to an opening in the door panel 105. The sliding member 107 may be opened manually by moving the sliding member 107 laterally or vertically. A transparent window 108 (shown in FIG. 1D) is positioned behind the sliding member 107. Sliding the sliding member 107 to expose the transparent window 108 is utilized to identify personnel through the door panel 105. The transparent window 108 may be a shatter resistant glass or plastic material.

The door panel 105 is coupled to the first jamb 115 by a hinge 117. The hinge 117 may be a continuous hinge or a piano hinge. The hinge 117 allows the door panel 105 to rotate about a rotational axis 118 (shown in FIG. 1A) to allow the door panel 105 to open and close relative to the second jamb 116. In the closed position as shown, the door panel 105 is secured by a plurality of locking devices such as a first lock member 120 and a second lock member 122.

The aircraft security door 100 is configured to be the weakest point of entry to an aircraft. For example, while the aircraft security door 100 as described herein may be locked to prevent ingress to the interior of the aircraft, the first lock member 120 and the second lock member 122 can be breached if sufficient force is used. While unauthorized access to the aircraft is not preferred, allowing access to unauthorized persons through the aircraft security door 100 prevents damage to other portions of the aircraft by the unauthorized persons. However, unauthorized access through the aircraft security door 100 will be evident by one or both of the first lock member 120 and the second lock member 122. Further, security cameras trained on the aircraft security door 100 are used to capture images of the unauthorized persons entering and/or exiting the aircraft.

One or both of the first lock member 120 and the second lock member 122 comprise tamper evident locks 124 that may be utilized to indicate unauthorized access to the aircraft. The first lock member 120 may be a combination lock 126 having a handle 128. The first lock member 120 may be a high security pedestrian door lock that has a keypad or biometric device that restricts access to all but authorized personnel. The second lock member 122 may be a sliding deadbolt lock that can be secured in a locked position by a tamper evident locking device, such as a padlock seal, a security seal or a security padlock. However, both of the first lock member 120 and the second lock member 122 can be breached upon application of sufficient force to allow access to unauthorized personnel. This makes the aircraft security door 100 the easiest point of entry to the aircraft and prevents damage to other parts of the aircraft when unauthorized persons attempt to enter the aircraft. Further, any fasteners that are accessible on outwardly facing sides or surfaces of the frame 110 are tamper proof fasteners (described in more detail below) which makes the aircraft security door 100 more difficult to breach. For example, the construction of the aircraft security door 100 is configured to make an attempted breach by opening the door panel 105 (e.g., breaking in to the aircraft via a breach of one or both of the lock members 120 and 122).

The side portions 114 as well as the door panel 105 include one or more vents 130. The vents 130 prevent over-pressurization in the fuselage of the aircraft. Each of the side portions 114 includes a utility pass-through box 132. Each utility pass-through box 132 includes a cover 133. The cover 133 is opened to access an opening 134 (shown in FIG. 1E) formed through each of the side portions 114. Each utility pass-through box 132 is utilized to route wires or cables through the side portions 114, if necessary. The side portions 114 as well as the door panel 105 include one or more handles 136. Each of the handles 136 are utilized to position and/or move the aircraft security door 100 during installation and removal. The handles 136 on the door panel 105 are recessed or flush pull handles 138 that are recessed into the door panel 105. The handles 136 on the side portions 114 are one or a combination of rigid pull handles 140 and folding pull handles 142. Each of the side portions 114 includes a first or exterior surface 144 and a second or interior surface 146 (both shown in FIG. 1E). The side portions 114 include one or more folding pull handles 142 on each of the exterior surface 144 and the interior surface 146.

The majority of the aircraft security door 100 is made of metallic materials that resist corrosion, such as aluminum and stainless steel. The frame 110 is either welded or coupled together using fasteners, such as bolts or screws. Portions of the fasteners comprise tamper proof security screws 123. For example, the fasteners for the hinge 117 and the vents 130, as well as any fasteners that are accessible on the outwardly facing surfaces of the door panel 105 and the side portions 114, are tamper proof security screws 123.

Each of the side portions 114 includes one or more hook points 148. Each of the hook points 148 are utilized to secure the aircraft security door 100 to a transfer pallet (not shown but described in detail below). For example, when the aircraft security door 100 is transferred, tie-down straps are coupled between the transfer pallet and the aircraft security door 100 to secure the aircraft security door 100 to the pallet.

In some implementations, transfer wheels 150 are coupled to the frame 110. The transfer wheels 150 aid in moving the aircraft security door 100 and/or positioning of the aircraft security door 100 during installation or removal of the aircraft security door 100.

The base portion 112 of the aircraft security door 100 includes a floor portion 152. The floor portion 152 includes a ramp 154. The ramp 154 has a portion 156 that extends into the aircraft (not shown).

The roof portion 113 includes a slanted roof panel 158. The slanted roof panel 158 is angled to allow water, such as rain, to flow off a lower side of the roof portion 113. As shown in FIG. 1F, the slanted roof panel 158 is slanted at an angle 160 of about 5 degrees to about 15 degrees relative to a plane of the base portion 112 (e.g., horizontal).

The roof portion 113 includes one or more storage blocks shown as long storage blocks 162 and short storage blocks 164. The storage blocks 162, 164 are utilized to store the aircraft security door 100 when the aircraft security door 100 is not in use. The heights of the storage blocks 162, 164 are different in order to account for the angle 160 of the slanted roof panel 158. Therefore, when the aircraft security door 100 is stored in an upside down orientation, the base portion 112 is coplanar with horizontal. The storage blocks 162, 164 may be made of a thermoplastic material or a foam material. The storage blocks 162, 164 are removably fastened to the frame 110 to facilitate removal, if desired. While not shown, storage blocks may be included on the base portion 112.

The roof portion 113 also includes a hoist ring 166. The hoist ring 166 is utilized to transfer and/or position the aircraft security door 100 during installation or removal. The hoist ring 166 is configured to couple to a hook (not shown) that is utilized to suspend, lift and/or lower the aircraft security door 100. The hoist ring 166 is located at a position that is the center of gravity of the aircraft security door 100. Therefore, the aircraft security door 100 may be suspended and/or moved in a balanced upright orientation.

The aircraft security door 100 is attached to the aircraft using a plurality of clamps and hooks. The clamps and hooks are shown as first clamp devices 168 and second clamp devices 170 in FIGS. 1D-1G and FIG. 2.

Figure 2:
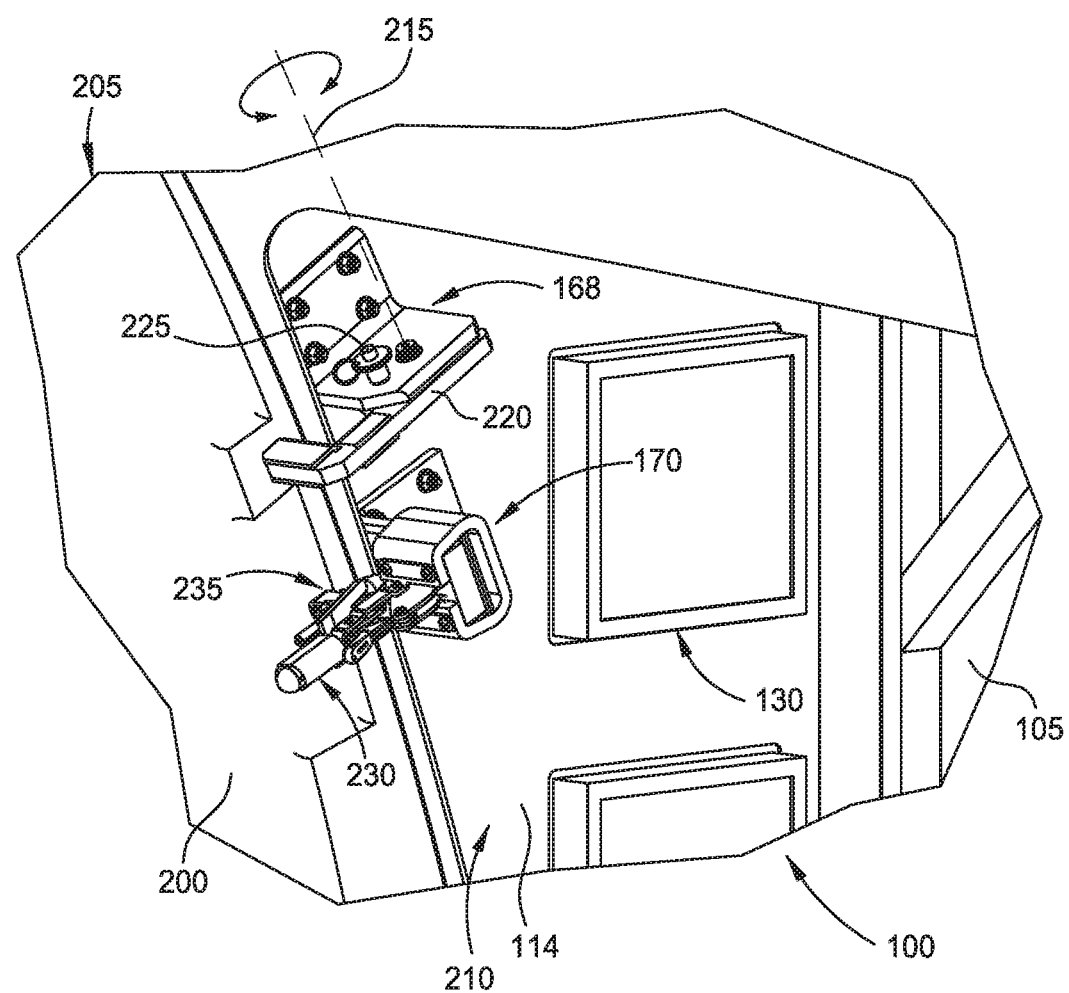
FIG. 2 is an enlarged perspective view of a portion of a fuselage of an aircraft and a portion of the aircraft security door is shown in an opening of the fuselage.

FIG. 2 is an enlarged perspective view of a portion of a fuselage 200 of an aircraft 205. A portion of the aircraft security door 100 is shown in an opening 210 of the fuselage 200. In FIG. 2, the perspective view is from the vantage point looking out from the opening 210. One of the first clamp devices 168 and one of the second clamp devices 170 is shown coupled to the fuselage 200. The first clamp devices 168 are configured as a safety latch that rotates about a rotational axis 215. Each of the first clamp devices 168 include an L-shaped hook 220 that is configured to fix the aircraft security door 100 onto the fuselage 200. The first clamp devices 168 may include a locking mechanism 225 that prevents the L-shaped hook 220 from moving in the rotational axis 215.

However, the aircraft security door 100 may move slightly relative to the opening 210, and the second clamp devices 170 are utilized to further fix the aircraft security door 100 to the fuselage 200. Each of the second clamp devices 170 are locking clamps, such as locking toggle clamps. Each of the second clamp devices 170 include a series of levers and pivot points operable by a movable handle 230. Movement of the handle 230 applies a force against the fuselage 200 via an adjustable spindle 235 to clamp the aircraft security door 100 onto the aircraft 205. However, movement of the handle 230 in an opposite direction releases the adjustable spindle 235 from the aircraft 205.

Figure 3A:
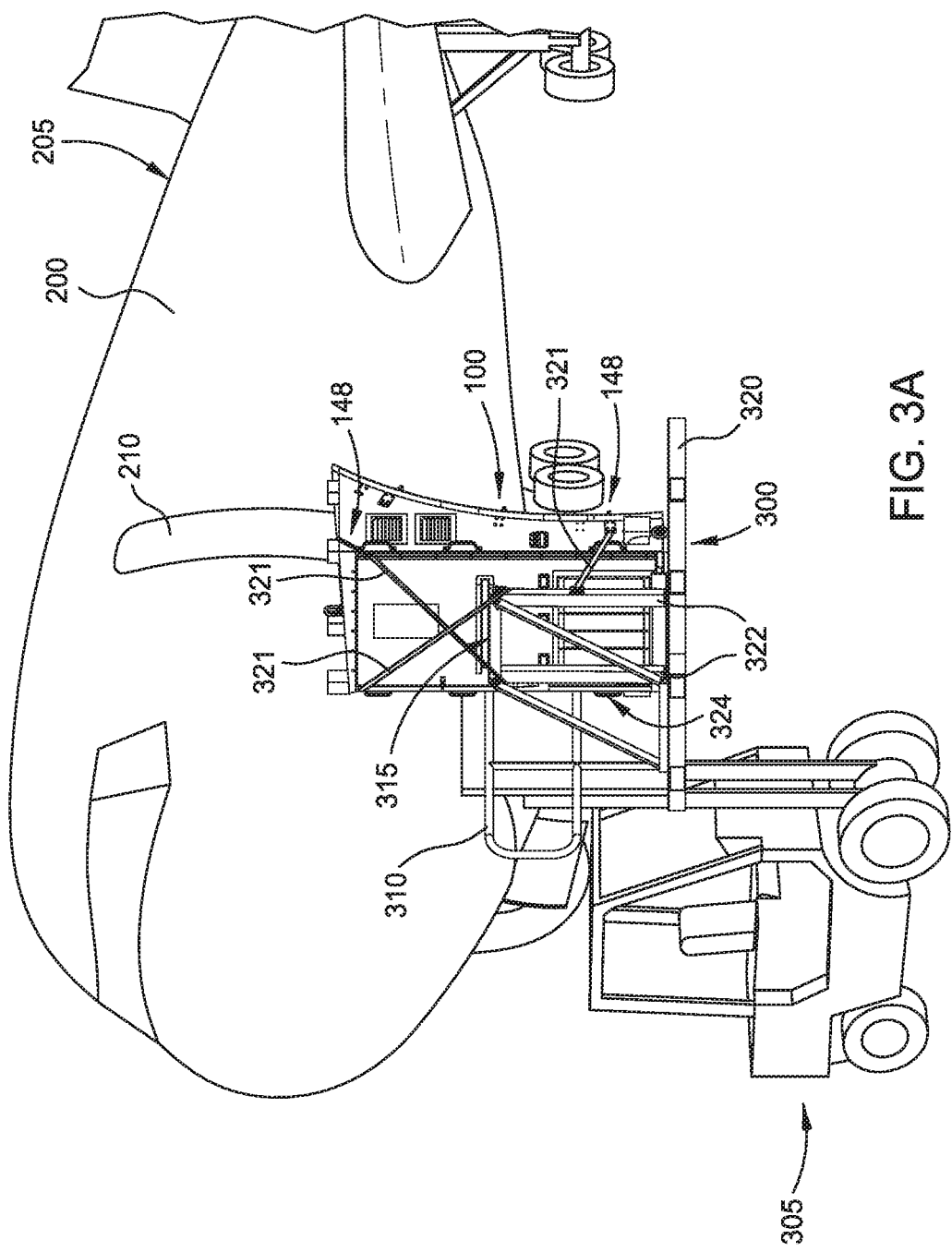
FIG. 3A is a perspective view of the aircraft security door coupled to a transport pallet.
Figure 3B:
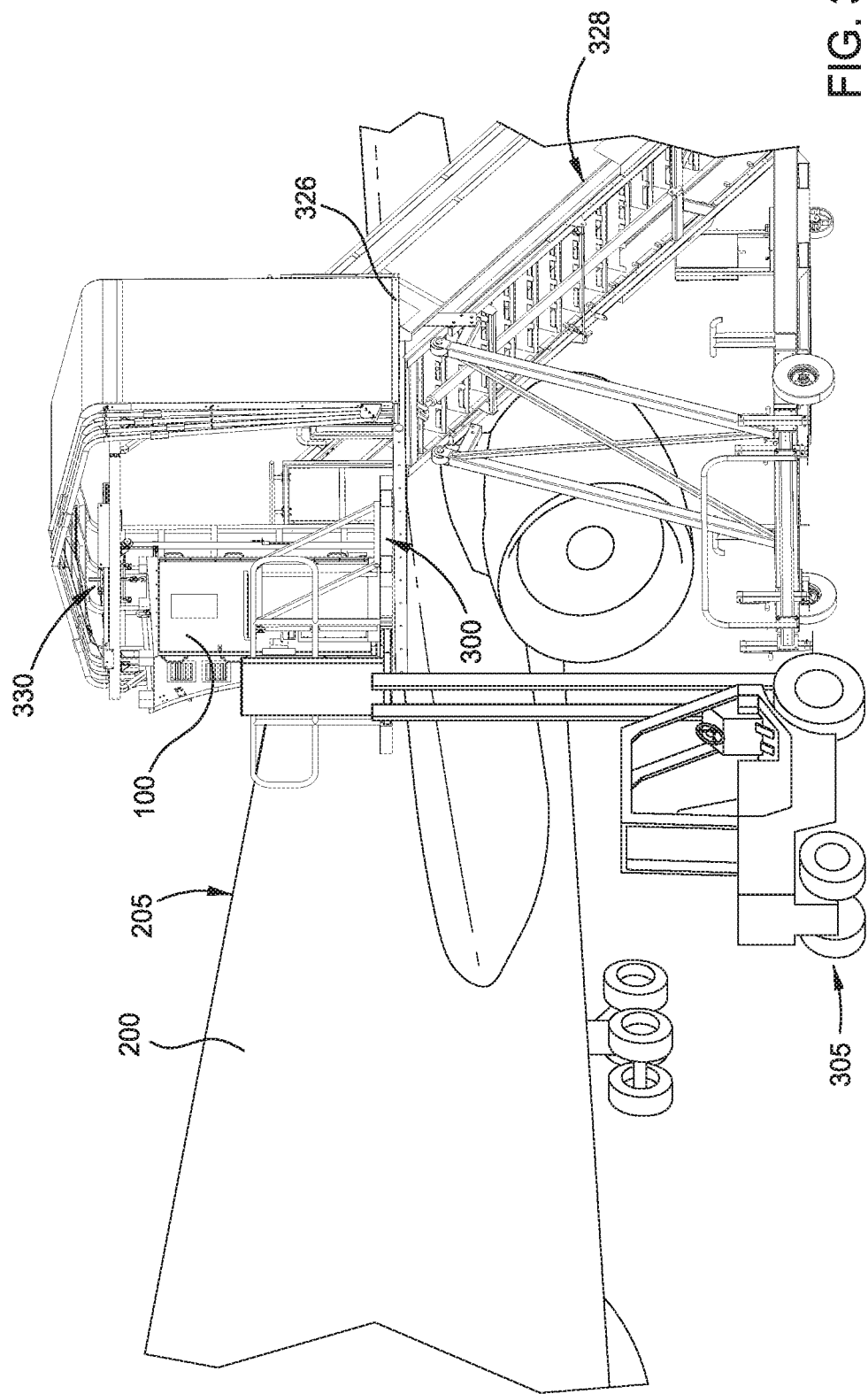
FIG. 3B is a perspective view of the aircraft security door on the transport pallet being transferred to a platform of an aircraft service stair.
Figure 3C:
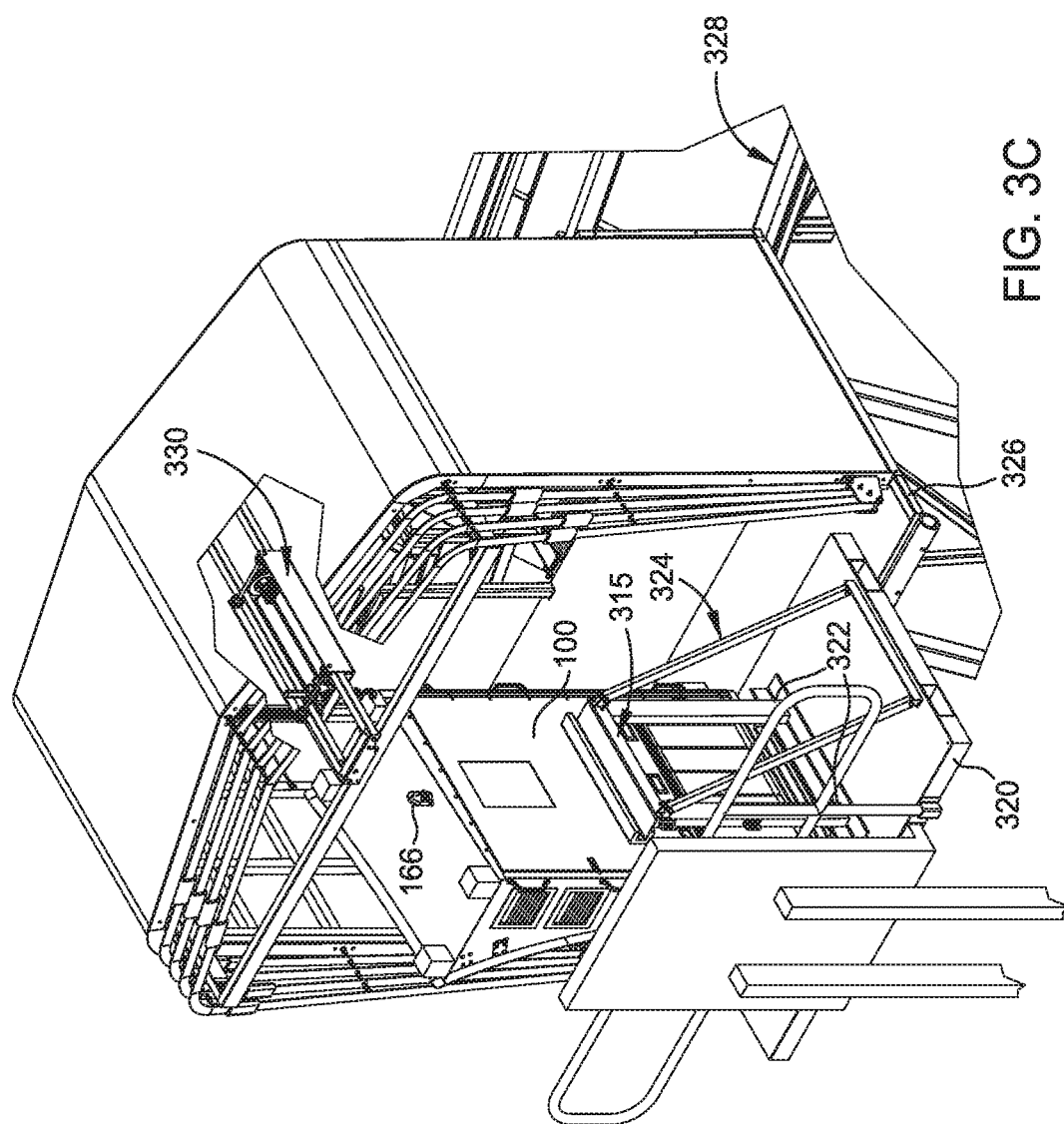
FIG. 3C is an enlarged perspective view of the transfer process of FIG. 3B.
Figure 3D:
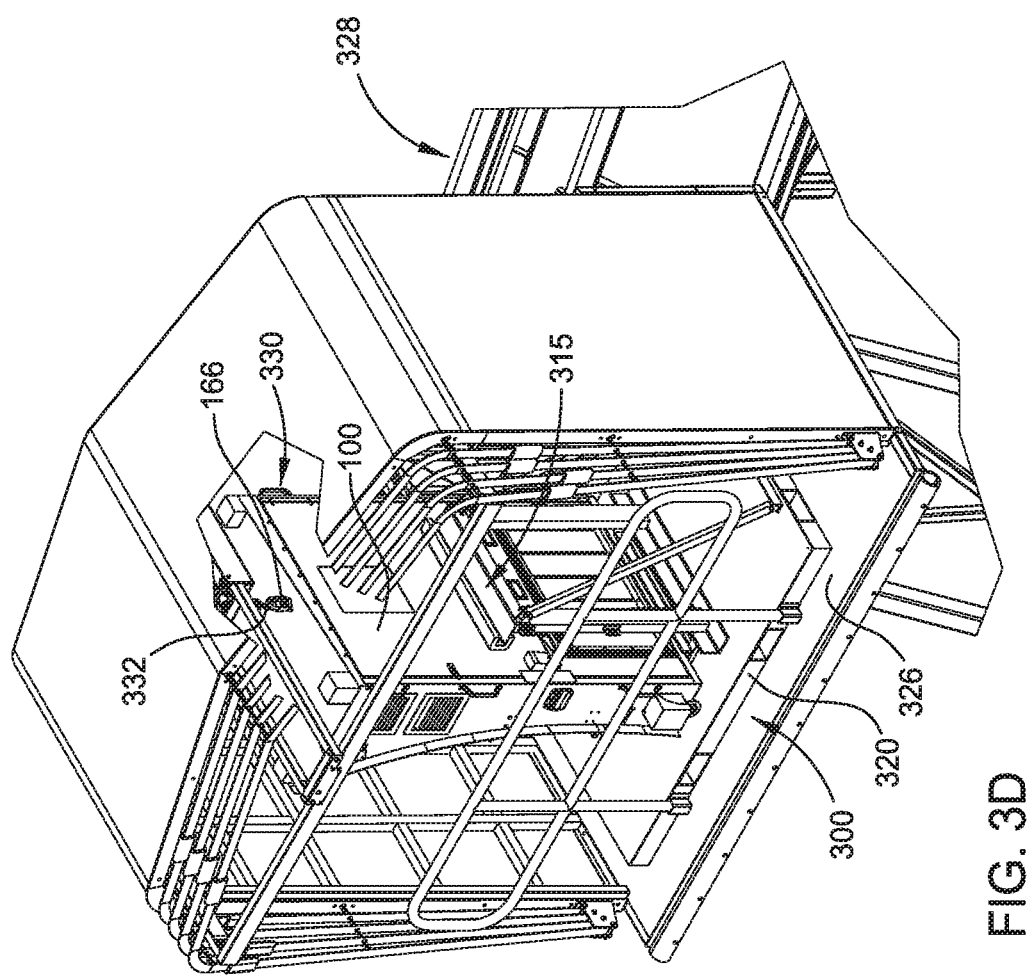
FIG. 3D shows the transport pallet to the platform of the aircraft service stair.
Figure 4A:
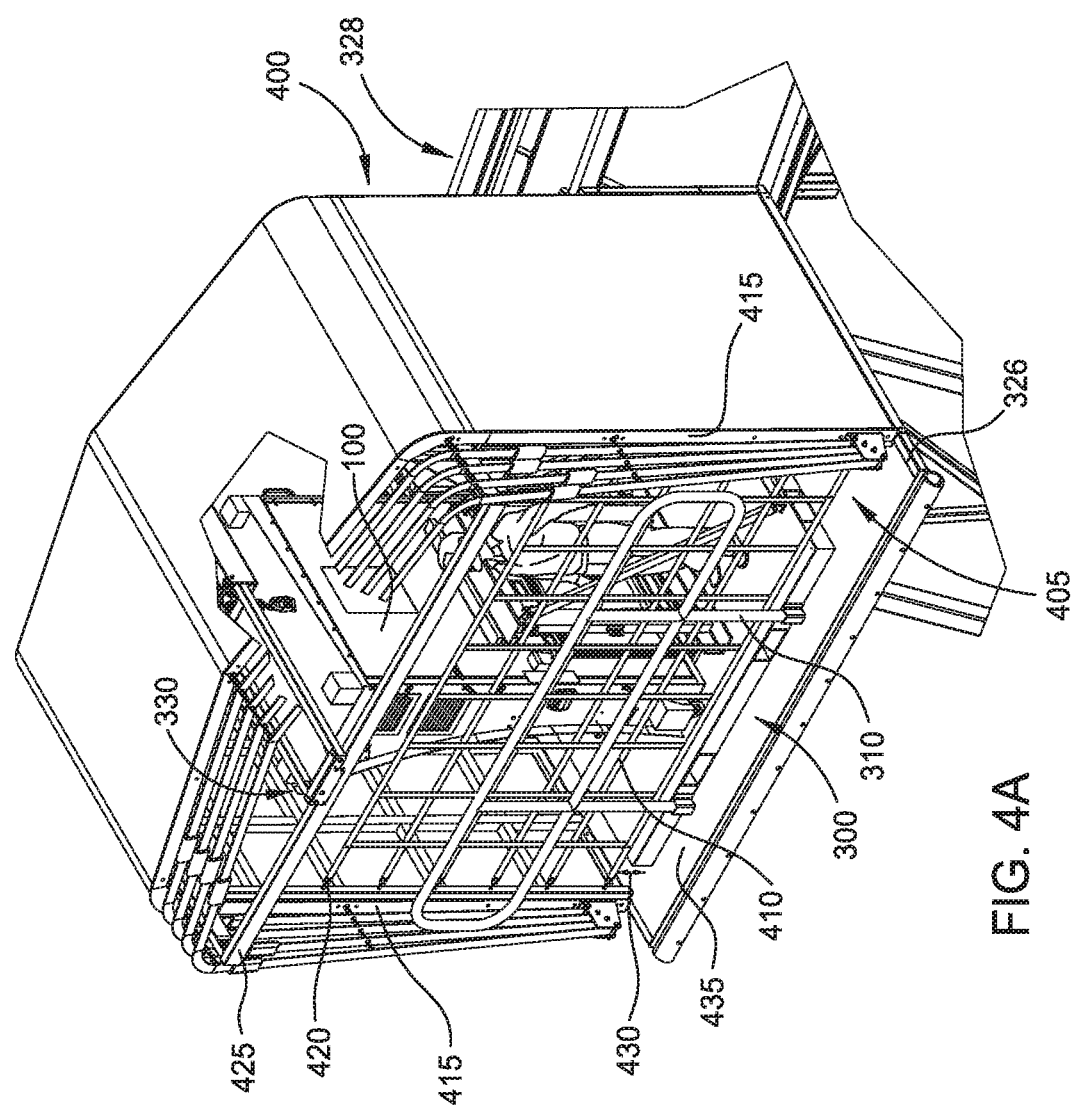
FIGS. 4A-4C are various perspective views showing handling procedures of the aircraft security door on the aircraft service stair.
Figure 4B:
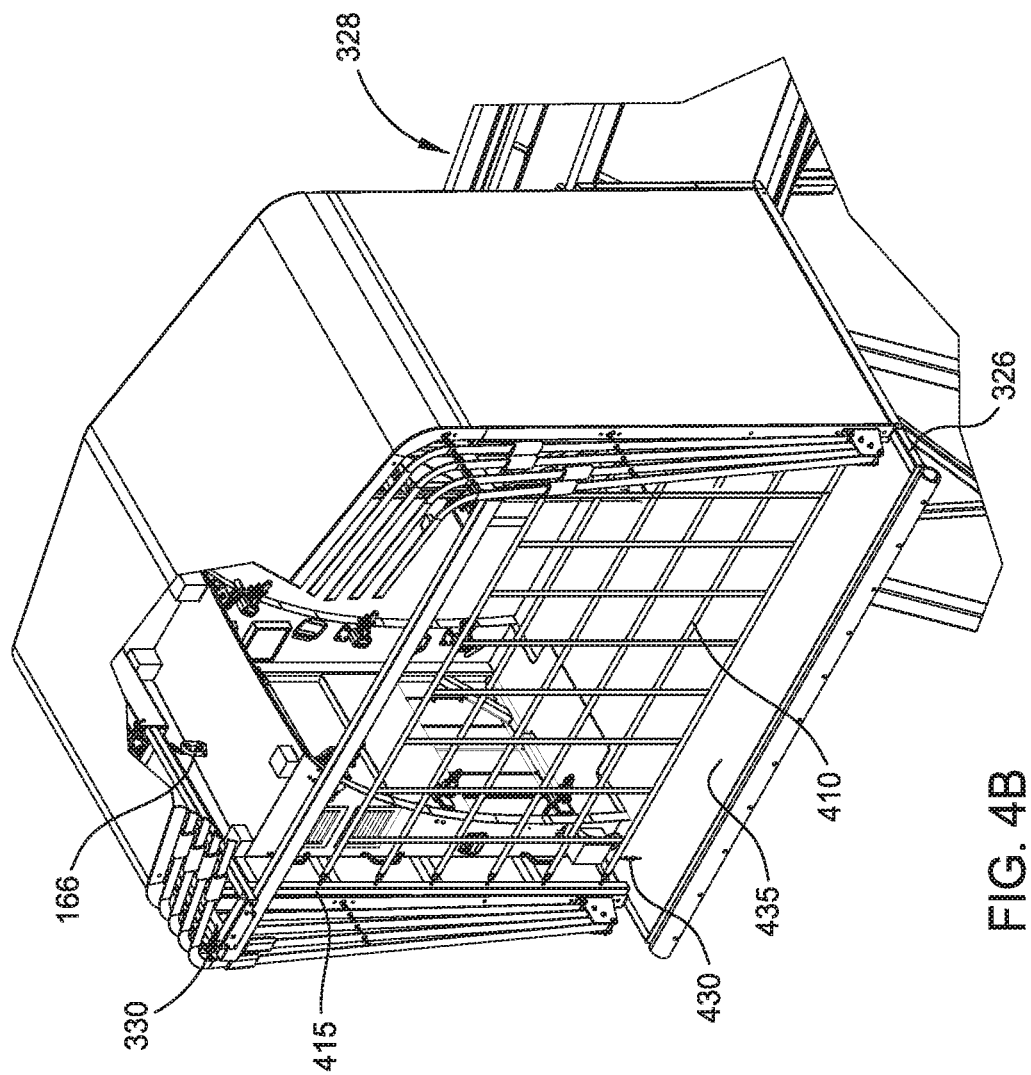
Figure 4C:
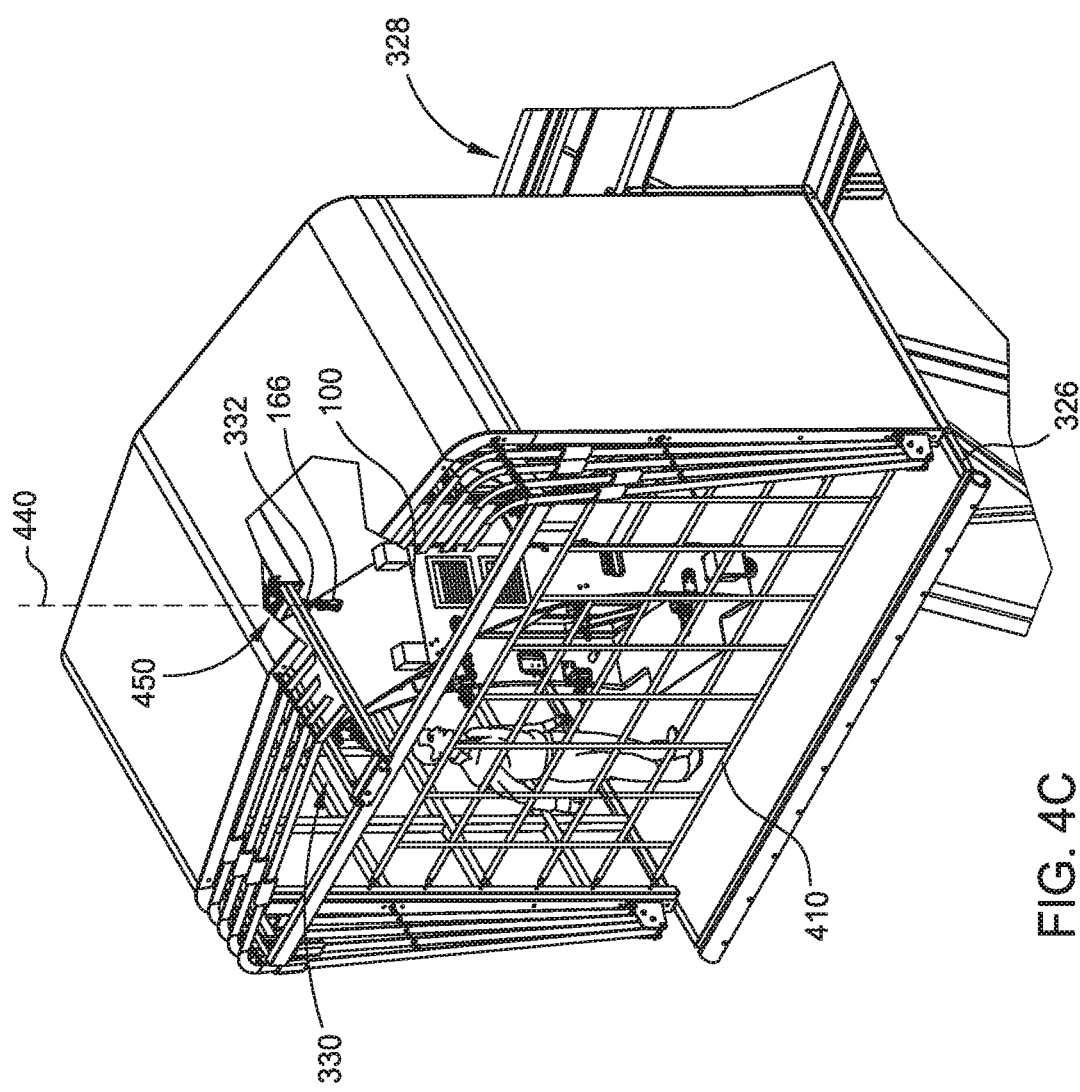
Figure 8A:
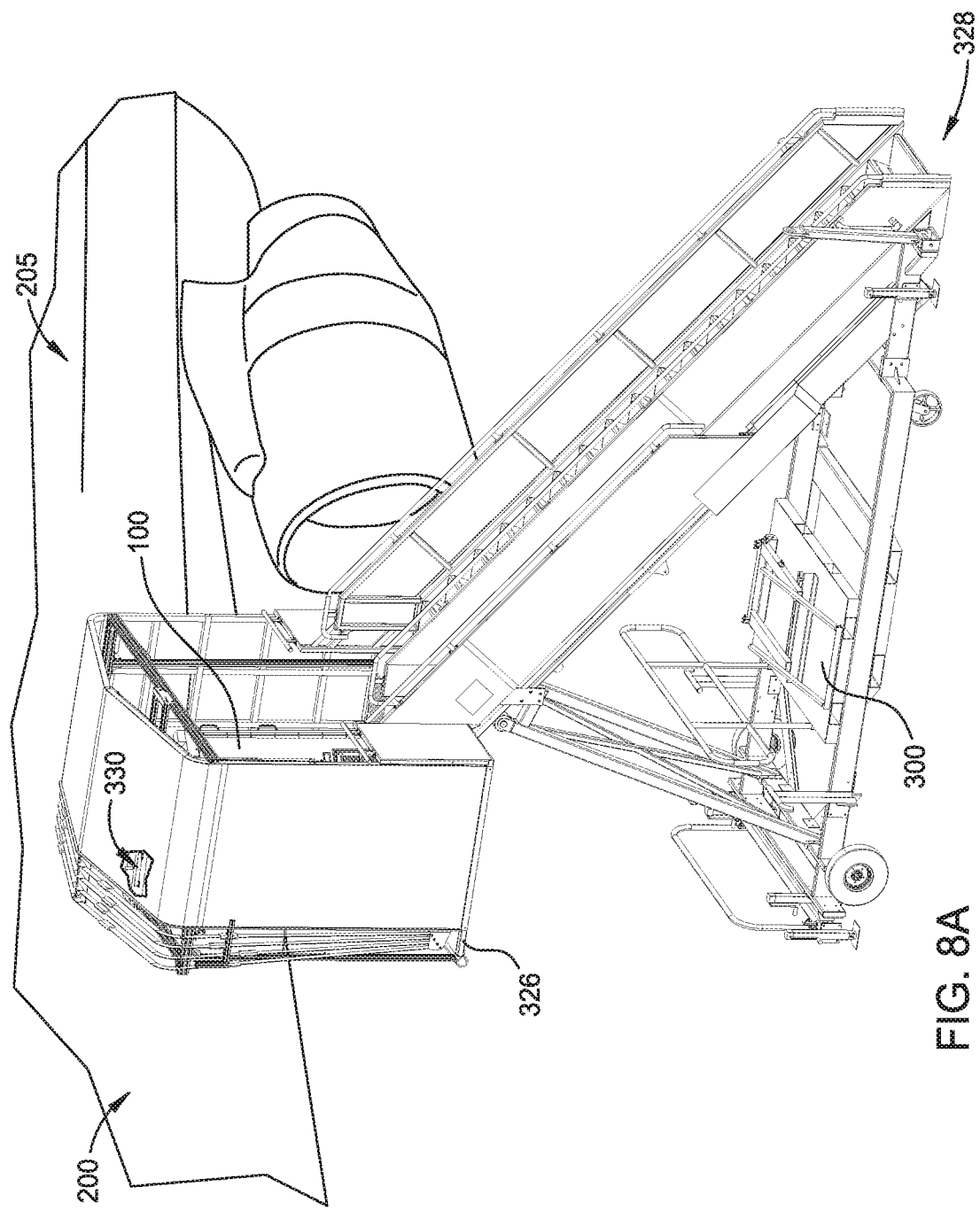
FIGS. 8A and 8B show another portion of the installation system and/or installation method configured to transfer the aircraft security door to an aircraft and couple the aircraft security door thereto as described herein, continued from FIGS. 3A-4C above.
Figure 8B:
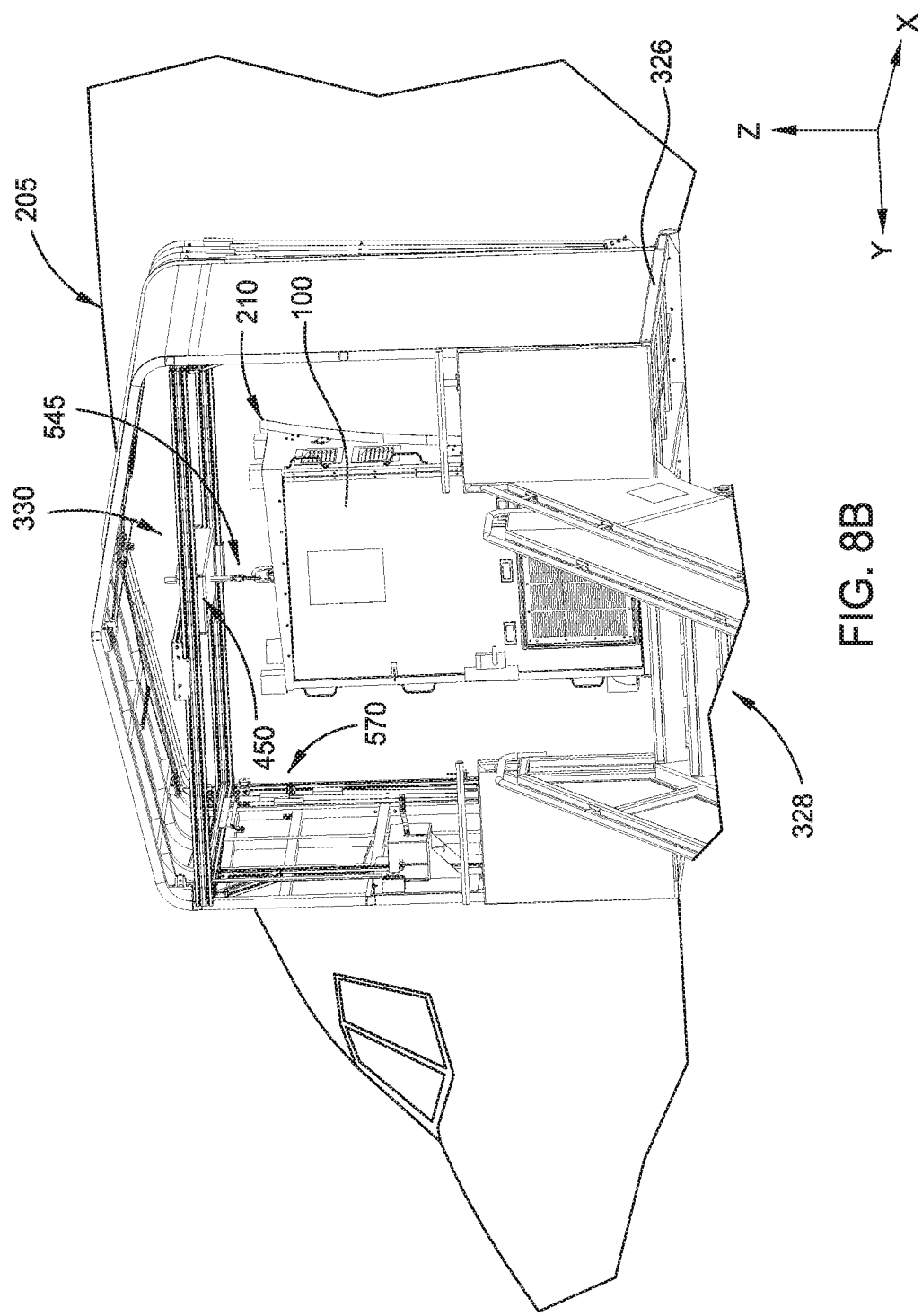

FIGS. 3A-4C are various schematic views showing a portion of an installation system and/or installation method configured to transfer the aircraft security door 100 to an aircraft and couple the aircraft security door 100 thereto as described herein. FIGS. 3A-3D show the aircraft security door 100 being transferred to an aircraft service stair; FIGS. 4A-4C show handling methods for the aircraft security door 100 when it is on the aircraft service stair; and FIGS. 8A-8B show the aircraft security door 100 being installed on the fuselage of an aircraft.

In FIG. 3A, the aircraft security door 100 is shown coupled to a transport pallet 300. The transport pallet 300 is disposed on a forklift 305 that moves the transport pallet 300 about the aircraft 205. The aircraft security door 100 as well as the transport pallet 300 is foreign object debris (FOD) compliant in order to creation of reduce foreign object damage from portions of the aircraft security door 100 and/or the transport pallet 300.

The transport pallet 300 includes a first railing 310 and a second railing 315. The first railing 310 is fixed to a base member 320 in an upright orientation. The first railing 310 may be utilized as a safety railing for personnel working on the base member 320. The second railing 315 is utilized as a support member for the aircraft security door 100. Straps 321, coupled between the transport pallet 300 and the hook points 148, are utilized to secure the aircraft security door 100 during transport.

The second railing 315 is fixed to the base member 320 by one or more hinge devices 322. The hinge devices 322 comprise a folding structure 324 that allows the second railing 315 to fold into a stowed position.

The transport pallet 300 is made of aluminum materials to be lightweight and weather resistant. The base member 320 includes slots formed in sidewalls thereof that receive forks of the forklift 305.

FIG. 3B is a perspective view of the aircraft security door 100 on the transport pallet 300 being transferred to a platform 326 of an aircraft service stair 328. FIG. 3C is an enlarged perspective view of the transfer process of FIG. 3B.

The aircraft service stair 328 is similar to other stairways used in the aviation industry. The aircraft service stair 328 may be sized for a wide body aircraft or a narrow body aircraft. A bridge crane 330 that facilitates handling of the aircraft security door 100 is positioned on the platform 326.

The aircraft service stair 328 is height adjustable and the platform 326 may be adjusted to a specific height for installation of the aircraft security door 100 in the opening 210 of the fuselage 200. The forklift 305 lifts the transport pallet 300 and the aircraft security door 100 to this height and moves the transport pallet 300 laterally above an upper surface of the platform 326.

In FIG. 3D, the transport pallet 300 is transferred onto the platform 326 of the aircraft service stair 328. The aircraft security door 100 remains in an upright orientation being secured to the second railing 315 and the transport pallet 300. Personnel (not shown) that install the aircraft security door 100 may climb onto the platform 326 to secure the aircraft security door 100 to the bridge crane 330.

Specifically, a hook 332 of the bridge crane 330 is coupled to the hoist ring 166 coupled to the aircraft security door 100. The bridge crane 330, which will be explained in detail in FIGS. 5A-5F, is utilized to lift the aircraft security door 100 a small distance above the base member 320 of the transport pallet 300. For example, the bridge crane 330 may lift the aircraft security door 100 only about 6 inches, or less, above the base member 320 if the transport pallet 300 to suspend the aircraft security door 100 above the transport pallet 300.

FIGS. 4A-4C are various perspective views showing handling procedures of the aircraft security door 100 on the aircraft service stair 328. The platform 326 of the aircraft service stair 328 has a stair case side 400 and an aircraft side 405 opposite the stair case side 400.

In FIG. 4A, the transport pallet 300 is resting on the platform 326 of the aircraft service stair 328. A safety net 410 is stretched across an opening formed on the aircraft side 405 of the platform 326. The safety net 410 may be secured to side posts 415 of the platform 326 by a plurality of coupling members 420 in one implementation. Each of the plurality of coupling members 420 may be a combination of D-rings and snap hooks that are secured by personnel. In another implementation, the safety net 410 may be a curtain that is movably suspended by a top rail 425. The curtain type safety net 410 may be secured using the plurality of coupling members 420.

The transport pallet 300 is positioned on the platform 326 such that the first railing 310 is outside of the safety net 410. However, the first railing 310 may be utilized as a safety railing when personnel are deploying the safety net 410. After the safety net 410 is installed, and the aircraft security door 100 is suspended by the bridge crane 330, the transport pallet 300 may be removed from the platform 326 by the forklift 305 (not shown). To remove the transport pallet 300, the second railing 315 is folded to a stowed position via the folding structure 324 (The folding structure is explained in more detail in FIGS. 7A and 7B).

A gap 430 is provided between the safety net 410 and a surface 435 of the platform 326. The gap 430 is sized to allow the transport pallet 300, with the second railing 315 in a stowed position, to be move under the safety net 410 using the forklift 305 (not shown). The transport pallet 300 may then be stored on the aircraft service stair 328 which is shown in FIG. 8A.

FIG. 4C shows the aircraft security door 100 suspended by the bridge crane 330. The aircraft security door 100 cab be lifted or lowered (in the Z direction) relative to the surface 435 of the platform 326, as well as rotated about a rotational axis 440 of the hook 332 of the bridge crane 330. The bridge crane 330 also includes a trolley structure 450 that enables movement of the hook 332, with the aircraft security door 100 suspended thereon, laterally (in an X-Y plane).

Figure 5A:
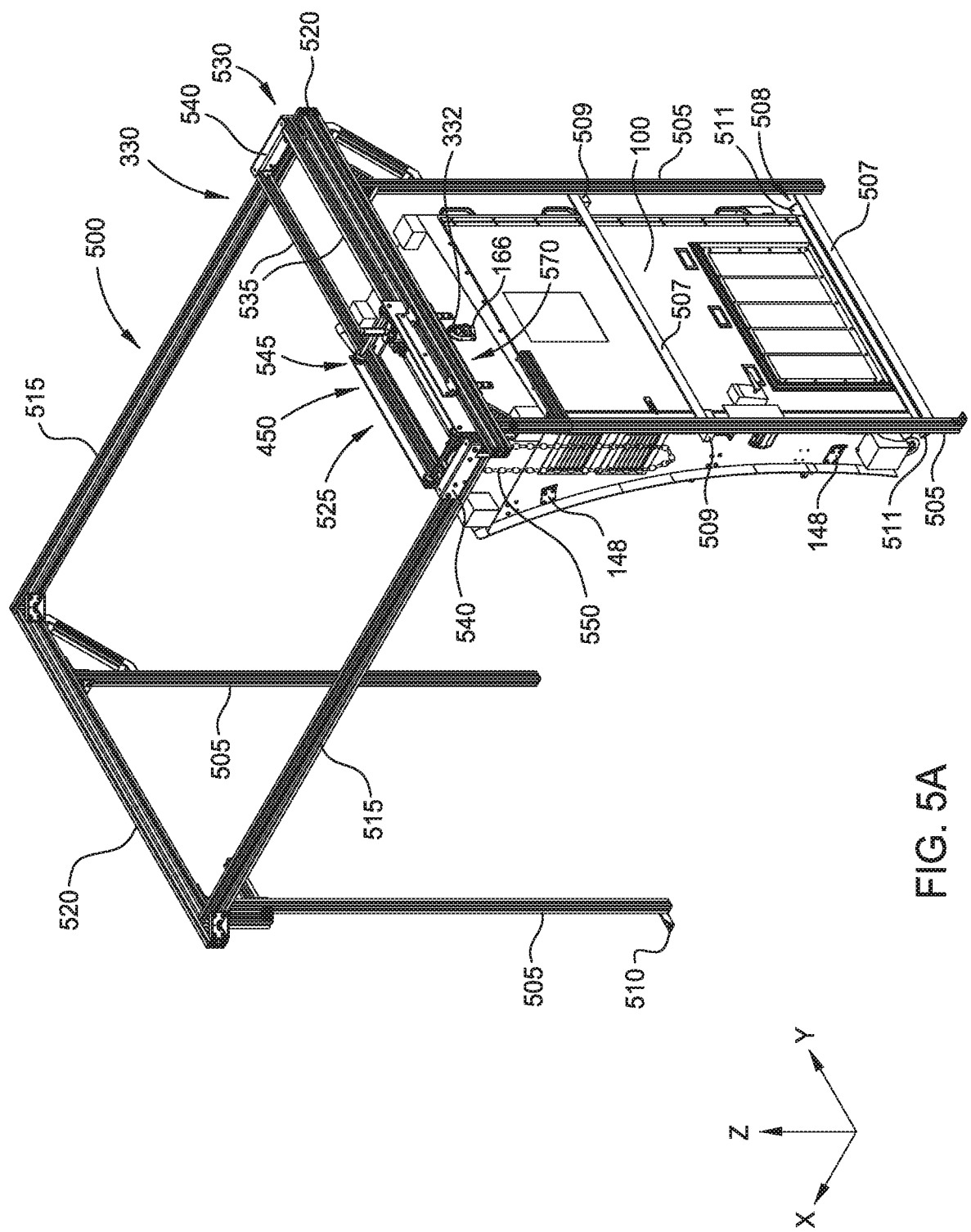
FIG. 5A is an isometric view of the bridge crane shown on the aircraft service stair of FIGS. 4A-4C.

FIG. 5A is an isometric view of the bridge crane 330 with the aircraft security door 100. The aircraft security door 100 is shown suspended from the hook 332 of the trolley structure 450.

The bridge crane 330 includes a frame 500 that is supported by a plurality of support members 505, such as posts. Each of the support members 505 include a mounting plate 510 that may be used to couple the frame 500 to the surface 435 of the platform 326 (shown in FIG. 4B). The frame 500 also includes two first rail members 515 that extend in the X direction in a substantially parallel relationship. Ends of each of the first rail members 515 are coupled to one or both of the support members 505 and an end rail 520 extending in the Y direction. A trolley 525 is positioned on a trolley frame 530 that is movable along the first rail members 515 in the X direction.

The trolley frame 530 includes two second rail members 535 that support the trolley 525. The second rail members 535 extend in the Y direction in a substantially parallel relationship and the trolley 525 is also movable in the Y direction. Each end of the second rail members 535 are coupled to a rolling member 540. The rolling members 540 are movably coupled to the two first rail members 515 and allow the trolley frame 530 to roll along the two first rail members 515 in the X direction.

On one short side of the frame 500, two cross members 507 are provided between two of the support members 505. Additionally, a cradle assembly 508 is shown on the short side of the frame 500. The cradle assembly 508 engages a lower portion of the aircraft security door 100 when the aircraft security door 100 is positioned adjacent thereto. The cradle assembly 508 is a channel that is sized to receive a portion of the tubular member 109A of the aircraft security door 100 in a manner similar to the cradle 625 shown in FIG.

6F. While not explained in detail, the cradle assembly 508 is constructed similarly to the cradle 625 described in FIG. 6F.

When the aircraft security door 100 is positioned as shown in FIG. 5A, the aircraft security door 100 is in a "locked" or "docked" position on the bridge crane 330. This "locked" or "docked" position allows the bridge crane 330 and the aircraft security door 100 to be moved (using a forklift and/or rolling movement of the aircraft service stair 328 (not shown) between aircraft and/or a hangar and an aircraft. A plurality of door blocks 509 are utilized between the support members 505 and corners of the aircraft security door 100. The door blocks 509 are utilized as a guide as well as cushioning members to prevent damage to the aircraft security door 100. Each of the door blocks 509 may be made of a polymeric material, such as a polyoxymethylene (POM) material.

FIG. 5B is an enlarged perspective view of the trolley 525 on the second rail members 535. FIG. 5C is an enlarged perspective view of the trolley frame 530. The trolley 525 includes a hoist 545 that is coupled to the hook 332. The hoist 545 includes a lead screw 556 and a gear motor 558. The lead screw 556 is coupled to the hook 332 by a swivel connector 547 (shown in FIG. 5C). The gear motor 558 is coupled to a shaft 560 and a pulley 562. The chain 550 is coupled to the pulley 562. Rotation of the pulley 562 rotates the shaft 560 and the gear motor 558 moves the lead screw 556 (and the hook 332) up or down (depending on the direction of rotation of the pulley 562). For example, the chain 550 has a first hanging portion 564A and a second hanging portion 564B. When the first hanging portion 564A is pulled downward, the pulley 562 (and the shaft 560) is rotated in a clockwise direction. Alternatively, when the second hanging portion 564B is pulled downward, the pulley 562 (and the shaft 560) is rotated in a counter-clockwise direction. Thus, personnel can raise or lower the aircraft security door 100 in the Z direction by pulling the respective hanging portions of the chain 550 down. When the chain 550 is not pulled, the gear motor 558 does not allow the shaft 560 to move, which facilitates stable suspension of the aircraft security door 100.

The hoist 545 is a simple mechanism and is constructed and/or operated with no cables.

The trolley 525 includes two rolling members 566 that allow the trolley 525 to roll along a length of the second rail members 535. Each of the rolling members 566 includes rollers 568. While not shown, the rolling members 540 on the trolley frame 530 are constructed similarly to the rolling members 566, and include rollers 568. The trolley structure 450 also includes a brake assembly 570. The brake assembly 570 is coupled to a sidewall 572 of the trolley structure 450 and is configured to lock the trolley structure 450 in the X and Y directions by coupling with the end rail 520.

In order to place the tubular member 109A of the aircraft security door 100 into the cradle assembly 508 of FIG. 5A, the aircraft security door 100 is lifted by the hoist 545 to clear an angled sidewall 511 of the cradle assembly 508. The aircraft security door 100 is then guided toward the support members 505 and the door blocks 509. Thereafter, the aircraft security door 100 may be lowered into the cradle assembly 508 by the hoist 545. Tie-down straps, such as the straps 321 (shown in FIG. 3A), may be used to secure the aircraft security door 100 to the frame 500. For example, tie-down straps may be coupled between the support members 505 and the hook points 148 (shown in FIG. 5A) to secure the aircraft security door 100 during transport.

Figure 5D:
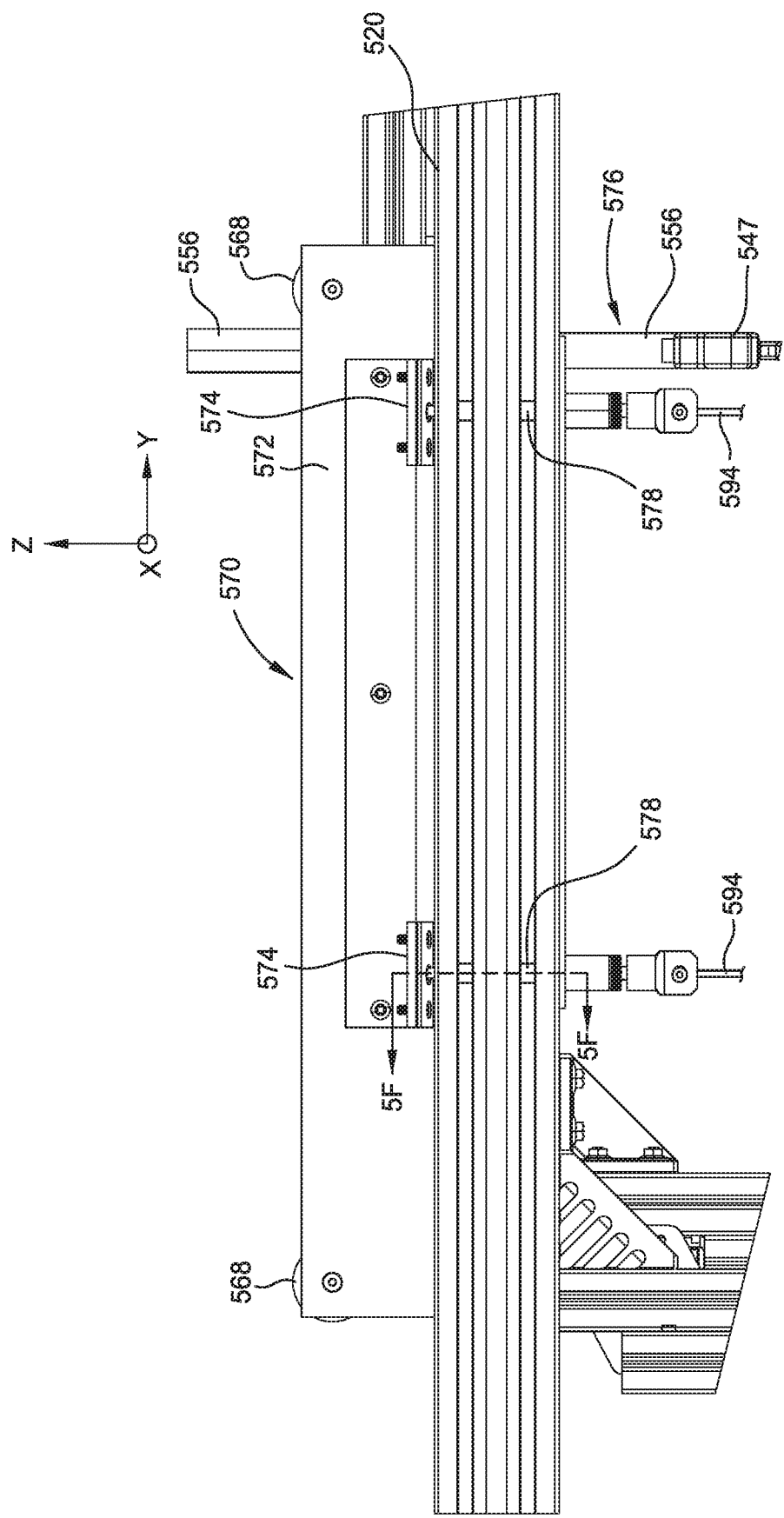
FIG. 5D is a side view of the brake assembly of the bridge crane.
Figure 5E:
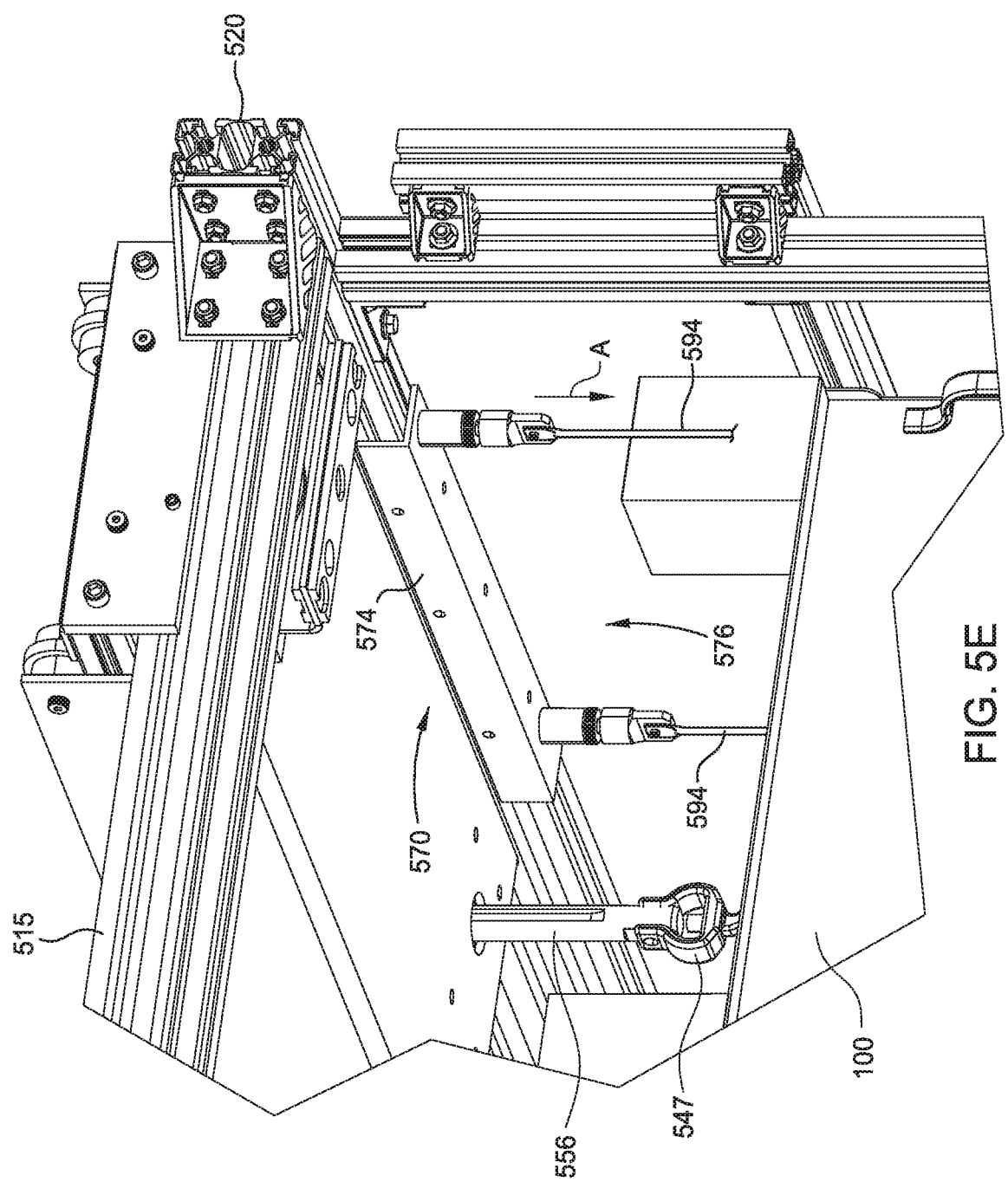
FIG. 5E is a bottom perspective view of the brake assembly of the bridge crane.

FIGS. 5D and 5E are various views of the brake assembly 570. FIG. 5D is a side view of the brake assembly 570 and FIG. 5E is a bottom perspective view of the brake assembly 570.

The brake assembly 570 includes a locking bracket 574 that is coupled to the sidewall 572 of the trolley structure 450. The brake assembly 570 also includes a locking mechanism 576 coupled to the end rail 520. The locking mechanism 576 is fixed to the end rail 520. The locking bracket 574 is fastened to the sidewall 572 of the trolley structure 450 and moves with the trolley structure 450 when not locked in by the locking mechanism 576. However, when the locking bracket 574 is engaged by the locking mechanism 576, the trolley structure 450 is in a "docked" or "locked" position.

The locking mechanism 576 includes a plurality of pins 578 that are movable in the Z direction into and out of engagement with the locking bracket 574. The plurality of pins 578 include a spring loaded mechanism adapted to engage the pins with the locking bracket 574. One or more pull cords 594 are coupled with the locking mechanism 576 to facilitate movement of the pins 578 into and out of engagement with the locking bracket 574.

Figure 5F:
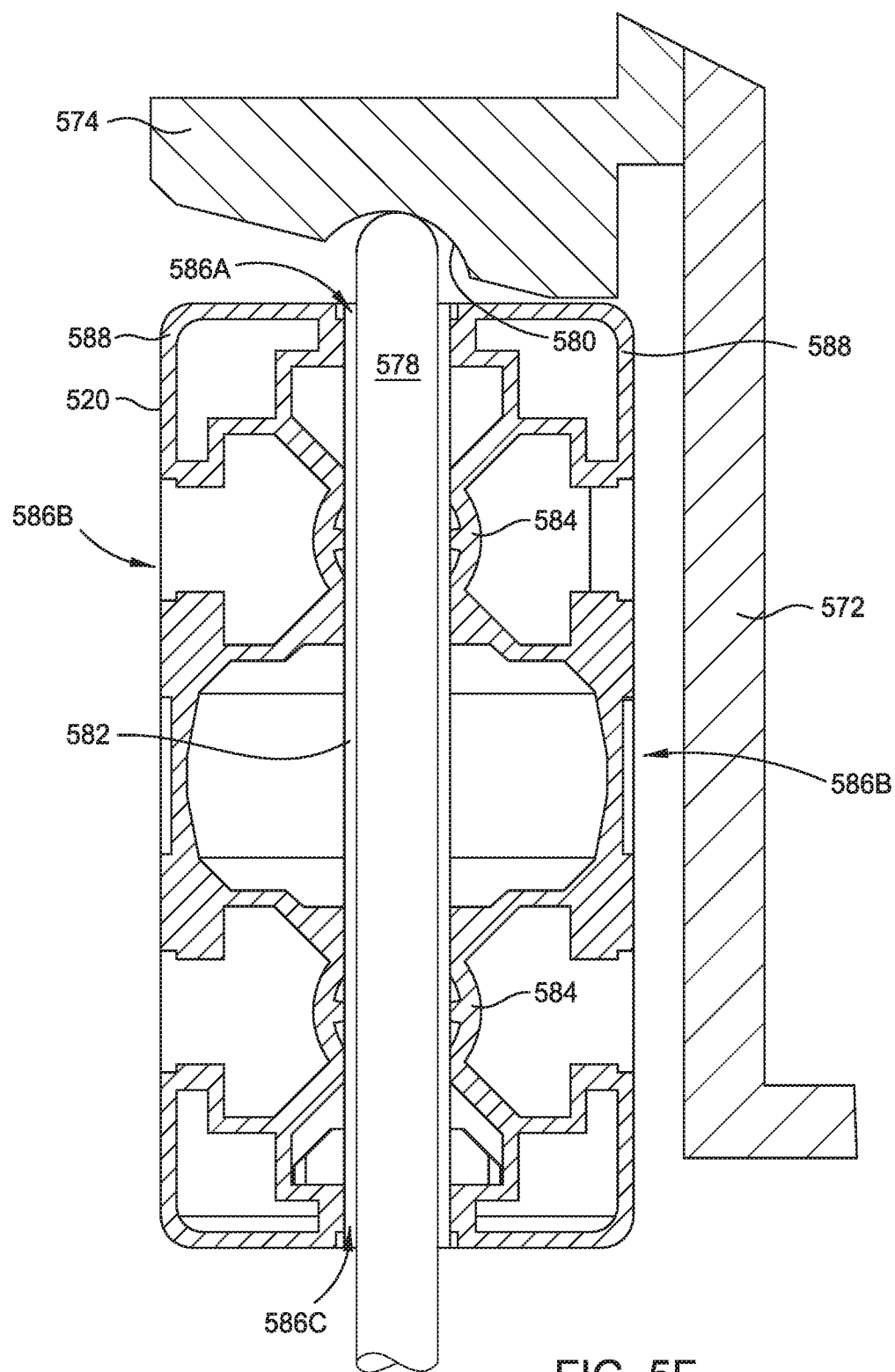
FIG. 5F is a cross-sectional view of a portion of the brake assembly along lines 5F-5F of FIG. 5D.

FIG. 5F is a cross-sectional view of one of the pins 578 that are engaged with a notch 580 formed in the locking bracket 574 along lines 5F-5F of FIG. 5D.

In one implementation, the end rail 520 is a strut made of an aluminum material having a structural shape as shown in FIG. 5F. The structural shape shown in FIG. 5F is marketed by the Bosch Group as struts sold under the tradename REXROTH®. Other structural members of the frame 500 may be the same as the end rail 520, such as the support members 505, the first rail members 515 and the second rail members 535.

The pins 578 (only one is shown in FIG. 5F) are movably disposed in openings 582 (only one is shown) in a circular web 584 of the end rail 520. When the pins 578 engage with the notch 580 as shown in FIG. 5F, the trolley 525 is laterally fixed relative to the end rail 520 and the frame 500.

The end rail 520 also includes grooves 586A-596D formed between corner structures 588. The rollers 568 of the rolling members 566 of the trolley 525 include a ridge that is sized to fit into the groove 586A. The ridge of the rollers 568 and the groove 586A facilitate alignment of the trolley 525 during relative movement thereof.

To disengage the pins 578 and allow lateral movement of the trolley 525 relative to the end rail 520, the locking mechanism 576 is utilized. Referring to FIGS. 5D and 5E, the locking mechanism 576 includes a pull cord 594 operably coupled to each of the pins 578. When the pull cords 594 are pulled downward by personnel, the pins 578 move downward in the direction of arrow A, thereby releasing the pins 578 from the notch 580 in the locking bracket 574. Thus, the trolley 525 is able to move laterally as long as the pull cords 594 are pulled or held downward by personnel to disengage the pins 578 from the respective notch 580.

Figure 6A:
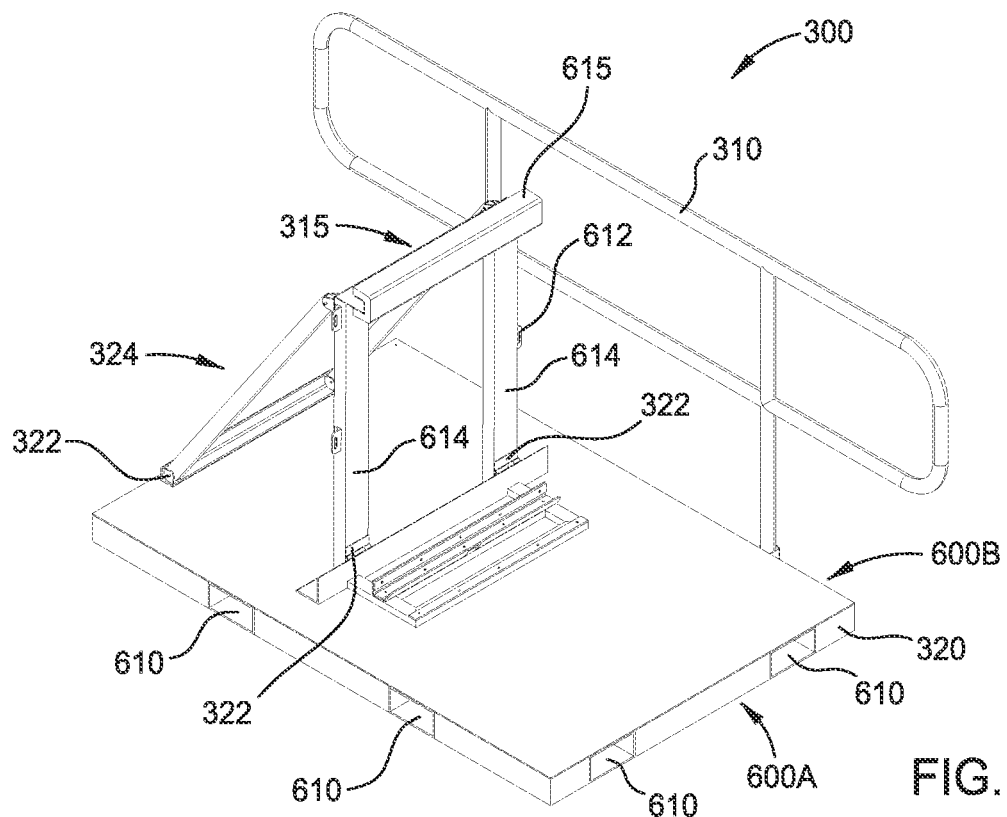
FIG. 6A is an isometric view of the transport pallet of FIGS. 3A-3D.
Figure 6B:
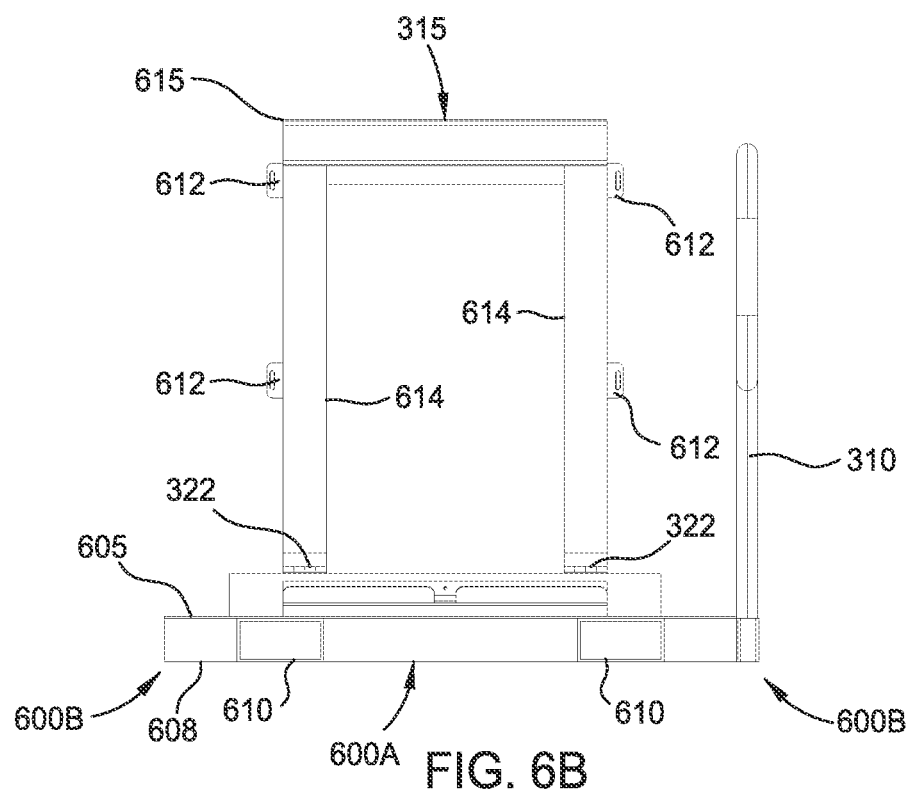
FIG. 6B is an elevation view of the transport pallet of FIG. 6A.

FIG. 6A is an isometric view of the transport pallet 300 of FIGS. 3A-3D. FIG. 6B is an elevation view of the transport pallet 300 of FIG. 6A. In FIGS. 6A and 6B, the folding structure 324 is in an upright position such that the second railing 315 is rigidly fixed to the base member 320.

The base member 320 includes two short sides 600A on opposing ends thereof and two long sides 600B on opposing ends thereof. The first railing 310 is provided on one of the long sides 600B along a length thereof and the second railing 315 is foldable in a transverse relation to one of the long sides 600B.

The base member 320 includes a first plate or top plate 605 and a second plate or bottom plate 608 in a spaced apart relation to the top plate 605. Multiple slots 610 are formed between the top plate 605 and the bottom plate 608 to receive forks from a forklift (not shown). The slots 610 are provided on the short sides 600A and the long sides 600B.

Anchor points 612 are also shown on two first rigid support members 614 of the second railing 315. The anchor points 612 are utilized to attach the straps 321 (shown in FIG. 3A). One set of hinge devices 322 are coupled between the top plate 605 and each of the first rigid support members 614.

Figure 6C:
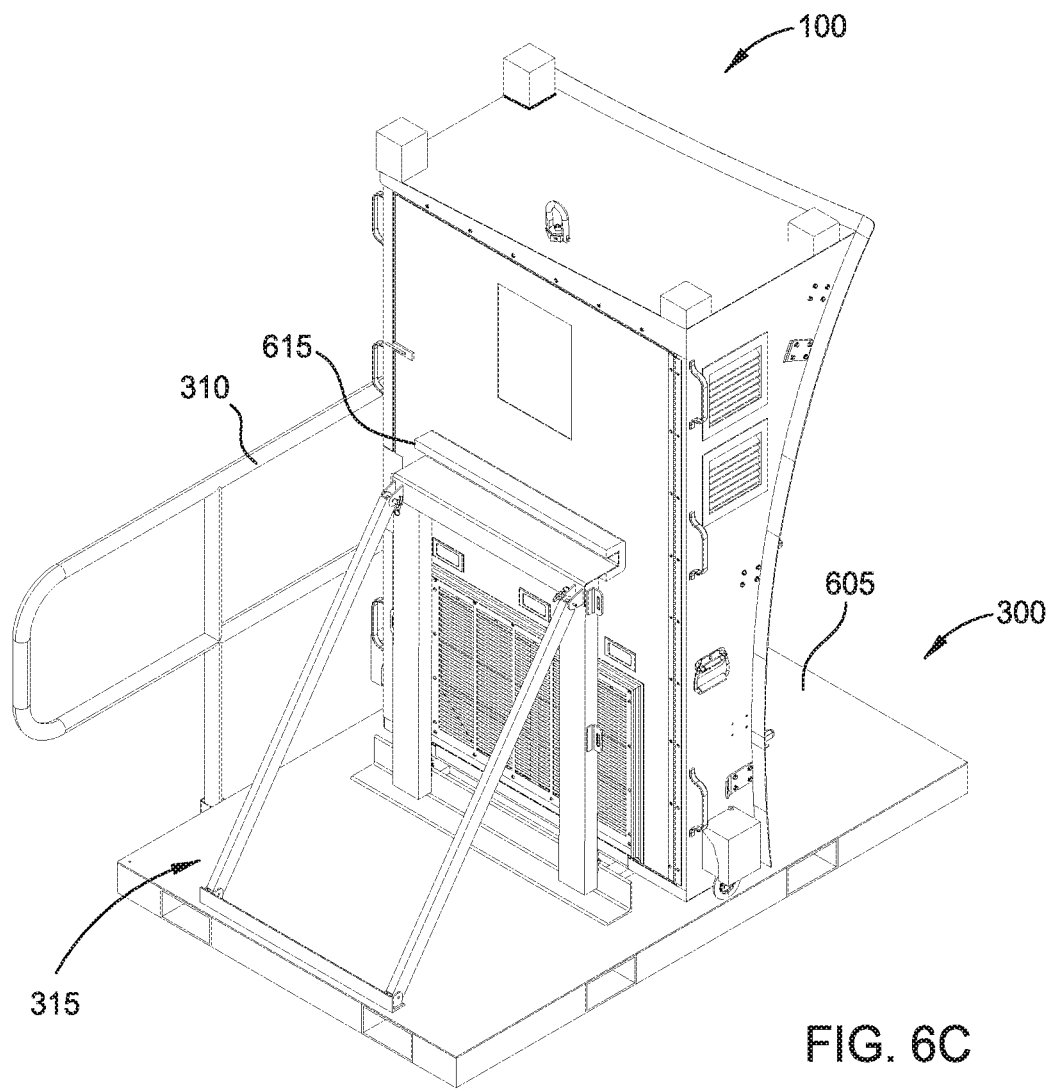
FIG. 6C is an isometric view of the transport pallet with the folding structure in an upright position to support the aircraft security door.
Figure 6D:
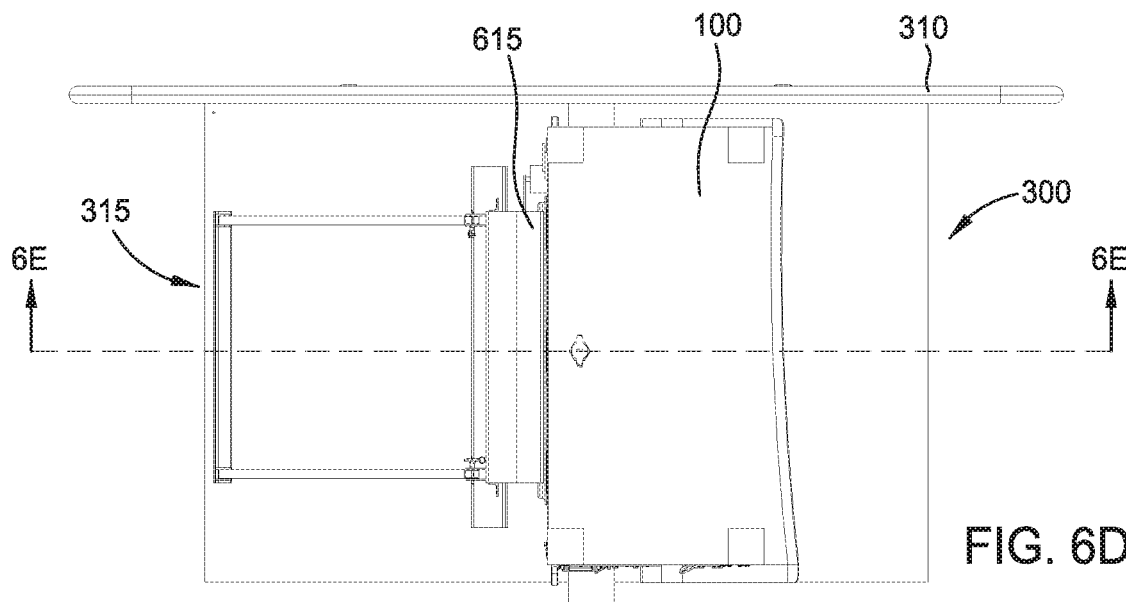
FIG. 6D is a top plan view of the transport pallet and the aircraft security door shown in FIG. 6C.

FIGS. 6C-6E are various views of the transport pallet 300 supporting the aircraft security door 100 of FIGS. 1A-1G. FIG. 6C is an isometric view of the transport pallet 300 with the folding structure 324 in an upright position to support the aircraft security door 100. FIG. 6D is a top plan view of the transport pallet 300 and the aircraft security door 100 shown in FIG. 6C. FIG. 6E is a sectional view of the transport pallet 300 and the aircraft security door 100 along lines 6E-6E of FIG. 6D.

The aircraft security door 100 rests on the transport pallet 300 and is secured in an upright position by the second railing 315. The second railing 315 includes a pad 615, made of foam rubber or other elastic material, to protect the aircraft security door 100.

Referring to FIG. 6E, the base portion 112 of the aircraft security door 100 rests on a raised support member 620. The raised support member 620 is coupled to the top plate 605 of the transport pallet 300. Details of the interface between the aircraft security door 100 and the raised support member 620 are discussed in FIG. 6F.

FIG. 6F is an enlarged view of a portion of the transport pallet 300 and the aircraft security door 100 shown in FIG. 6E. The raised support member 620 includes a cradle 625 that supports and holds the aircraft security door 100 relative to the transport pallet 300. The cradle 625 is a channel that is sized to receive a portion of the tubular member 109A of the aircraft security door 100. The cradle 625 includes an angled sidewall 511 that is angled about 45 degrees relative to a plane of the top plate 605. The cradle 625 also includes a backstop sidewall 635 that is angled about 90 degrees from a plane of the top plate 605. The backstop sidewall 635 prevents movement of the aircraft security door 100 towards the second railing 315. The angled sidewall 511 also prevents movement of the aircraft security door 100 away from the second railing 315 while also permitting removal of the aircraft security door 100 with little effort. The cradle 625 is made of a polymeric material, such as an ultra-high molecular weight (UHMW) plastic material.

Figure 7B:
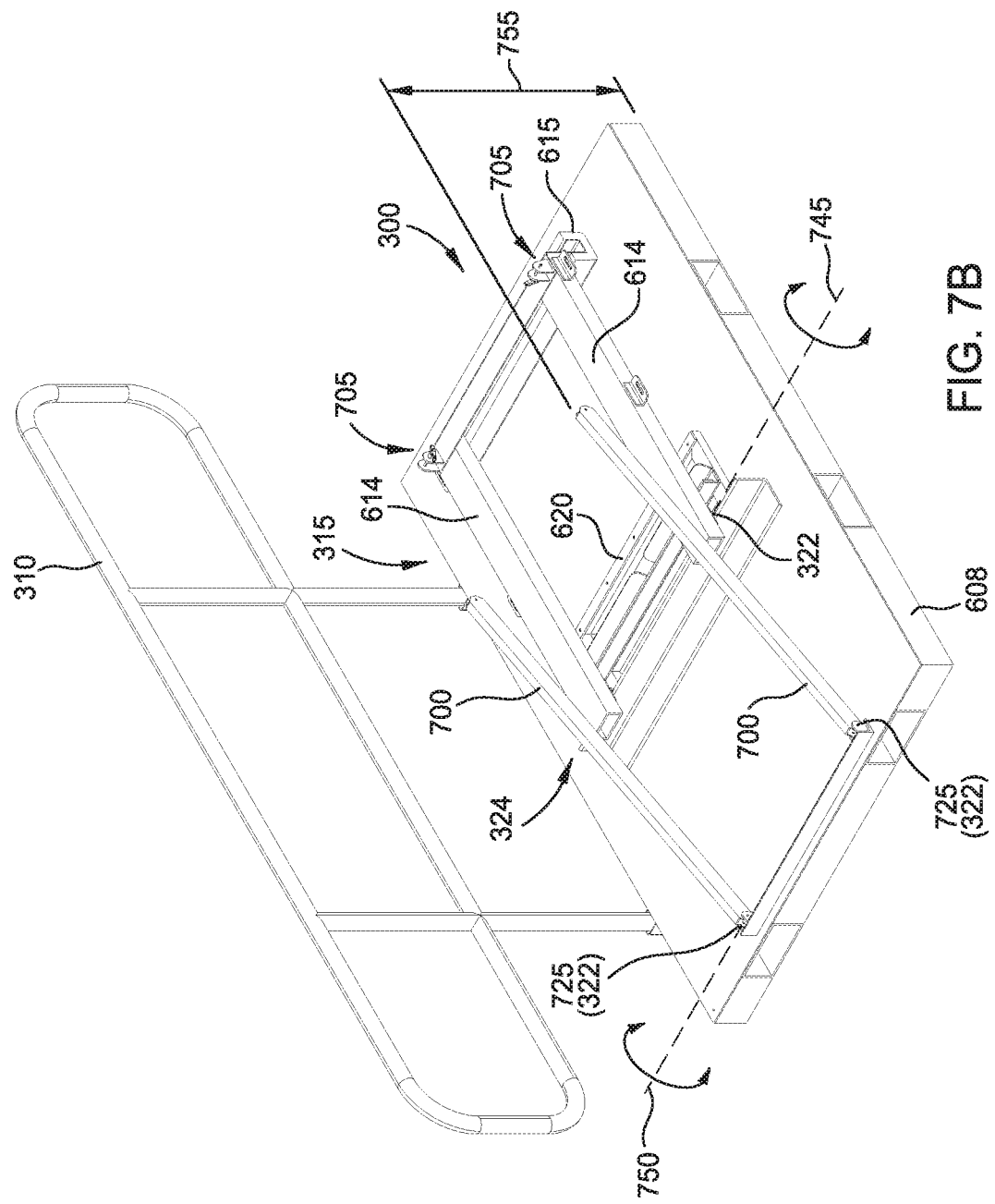

FIGS. 7A and 7B are perspective views of the transport pallet 300 showing operation of the folding structure 324. In FIG. 7A, the folding structure 324 is in an upright position to support the aircraft security door 100 (not shown) and the folding structure 324 is shown in a stowed position in FIG. 7B. FIGS. 7C-7D are enlarged views of portions of the second railing 315 showing coupling interfaces of the folding structure 324.

The folding structure 324 of the second railing 315 includes the first rigid support members 614 and two second rigid support members 700. A first coupling interface 705 is shown in FIG. 7C. The first coupling interface 705 includes a pair of ears 710 extending from a lateral support member 715 coupled to the first rigid support members 614. The first coupling interface 705 also includes a fastener 720 that interfaces with openings formed in the ears 710 and an opening in the second rigid support members 700. In some implementations, the fastener 720 may be a bolt or a pin securable by a retaining pin or clip. In other implementations, the fastener 720 is a pin having a push button retainer, and the pin is leashed to the second railing 315 (to prevent foreign object debris).

FIG. 7D shows a second coupling interface 725 of the folding structure 324. The second coupling interface 725 also comprises one of the hinge devices 322 of the folding structure 324. The second coupling interface 725 comprises a support member 730 that is coupled to the top plate 605 of the transport pallet 300. A gusset 735 is coupled to the support member 730. The gusset 735 and the second rigid support member 700 each include an opening that is sized to receive a fastener 740, such as a bolt and a nut.

Referring to FIG. 7B, the second railing 315 is folded into a stowed position by removing the first coupling interfaces 705 between the first rigid support members 614 and the second rigid support members 700, and rotating the first rigid support members 614 along a rotational axis 745. Similarly, the second rigid support members 700 are rotatable in a rotational axis 750 such that the second rigid support members 700 lay on top of a portion of the first rigid support members 614. In the stowed position, the folding structure 324 has a height 755 (measured from the bottom plate 608) of about 17 inches to about 18 inches. The height 755 corresponds to the gap 430 provided between the safety net 410 and a surface 435 of the platform 326 (shown in FIGS. 4A and 4B).

FIGS. 8A and 8B show another portion of the installation system and/or installation method configured to transfer the aircraft security door 100 to an aircraft and couple the aircraft security door 100 thereto as described herein, continued from FIGS. 3A-4C above. The aircraft service stair 328 has the aircraft security door 100 secured thereon by the bridge crane 330. The aircraft service stair 328 is moved toward the opening 210 (shown in FIG. 8B) of the fuselage 200 of the aircraft 205. During movement of the aircraft service stair 328, the aircraft security door 100 is secured by the bridge crane 330 and/or the brake assembly 570 (shown in FIGS. 5D and 5E).

In FIG. 8B, the platform 326 of the aircraft service stair 328 is positioned in proximity to the aircraft 205. The aircraft security door 100 is manipulated by personnel by moving the trolley structure 450 and/or hoist 545 of the bridge crane 330 to position the aircraft security door 100 relative to the opening 210 of the fuselage 200. After positioning of the aircraft security door 100, the aircraft security door 100 can be fastened to the opening 210 of the fuselage 200 as shown and described in FIG. 2.

What is claimed is:

1. An aircraft security door, comprising:
   a frame including side portions;
   a door panel coupled to the frame, the door panel surrounded by a first jamb and a second jamb, wherein:
      the door panel includes a vent and a transparent window coverable by a sliding member; and
      respective side portions are coupled to the first jamb and the second jamb, each side portion extending in a lateral direction away from the door panel such that the side portions and the door panel protrude outwardly from a fuselage of an aircraft when the door panel is in a closed position;
   one or more tamper evident locks coupled to the door panel;
   an arc-shaped member coupled to the side portions along a height of the frame; and a plurality of clamp devices coupled to each of the side portions for temporarily coupling the side portions to the fuselage.

2. The aircraft security door of claim 1, wherein the frame includes a base portion and a roof portion, and the roof portion includes a slanted roof panel.

3. The aircraft security door of claim 2, wherein the base portion extends in the lateral direction a first depth and the roof portion extends in the lateral direction a second depth, the second depth being greater than the first depth.

4. The aircraft security door of claim 1, wherein the plurality of clamp devices further comprises:
a plurality of first clamp devices each including a locking mechanism.

5. The aircraft security door of claim 4, wherein each of the first clamp devices comprise an L-shaped hook, and the locking mechanism prevents movement of the L-shaped hook.

6. The aircraft security door of claim 5, wherein the locking mechanism prevents the L-shaped hook from moving in a rotational axis.

7. The aircraft security door of claim 4, wherein the plurality of clamp devices further comprises:
a plurality of second clamp devices.

8. The aircraft security door of claim 7, wherein each of the second clamp devices include an adjustable spindle and a handle.

9. The aircraft security door of claim 1, wherein each of the side portions include a plurality of vents.

10. An aircraft security door, comprising:
a frame including a base portion, a roof portion, and side portions, wherein the roof portion includes a slanted roof panel;
a door panel coupled to the frame, the door panel surrounded by a first jamb and a second jamb, wherein:
the door panel includes a vent and a transparent window coverable by a sliding member; and
respective side portions are coupled to each of the first jamb and the second jamb, each side portion extending in a lateral direction away from the door panel such that the side portions and the door panel protrude outwardly from a fuselage of an aircraft when the door panel is in a closed position;
one or more tamper evident locks coupled to the door panel;
an arc-shaped member coupled to each side portion along a height of the frame; and
a plurality of clamp devices coupled to each of the side portions for temporarily coupling the side portions to the fuselage.

11. The aircraft security door of claim 10, wherein the slanted roof panel is slanted at an angle of about 5 degrees to about 15 degrees relative to a plane of the base portion.

12. The aircraft security door of claim 10, wherein the base portion extends in the lateral direction a first depth and the roof portion extends in the lateral direction a second depth, the second depth being greater than the first depth.

13. The aircraft security door of claim 10, wherein the plurality of clamp devices further comprises:
a first clamp device that extends past a plane of the arc-shaped member.

14. The aircraft security door of claim 13, wherein the first clamp device comprises an L-shaped hook and a locking mechanism that prevents the L-shaped hook from moving in a rotational axis.

15. The aircraft security door of claim 13, wherein the plurality of clamp devices further comprises:
a plurality of second clamp devices, wherein each of the second clamp devices include an adjustable spindle and a handle.

16. A method for installing an aircraft security door onto an aircraft, the method comprising:
transferring the aircraft security door to an aircraft service stair, wherein the aircraft security door includes a frame having side portions, a door panel coupled to the frame, the door panel surrounded by a first jamb and a second jamb, and the side portions, each side portion including an arc-shaped member coupled to each side portion along a height of the frame, wherein the door panel includes a vent and a transparent window coverable by a sliding member;
supporting the frame of the aircraft security door;
positioning the aircraft service stair in proximity to a fuselage of the aircraft adjacent to an opening in the fuselage;
positioning the side portions of the aircraft security door relative to the opening such that the side portions and the door panel protrude outwardly from the fuselage when the door panel is in a closed position; and
temporarily securing the side portions of the aircraft security door to the opening using a plurality of first clamp devices and a plurality of second clamp devices coupled to the side portions of the aircraft security door.

17. The method of claim 16, wherein positioning the aircraft service stair in proximity to the fuselage further comprises locking the aircraft security door using a brake assembly.

18. The method of claim 16, wherein each of the first clamp devices comprise an L-shaped hook and a locking mechanism that prevents the L-shaped hook from moving in a rotational axis.

19. The method of claim 16, wherein each of the second clamp devices include an adjustable spindle and a handle.

20. The method of claim 16, wherein the aircraft security door includes a base portion having a floor portion that includes a ramp that extends into the opening of the aircraft.

21. The aircraft security door of claim 1, wherein the frame includes a roof portion, and the roof portion includes a hoist ring located at a center of gravity of the aircraft security door.

22. The aircraft security door of claim 1, wherein the frame includes a roof portion, and the roof portion includes a plurality of storage blocks that extend at different heights from a surface of the roof portion.

23. The aircraft security door of claim 1, wherein at least one of the side portions includes a utility pass-through box.

24. The aircraft security door of claim 10, wherein at least one of the side portions includes a utility pass-through box.

25. The aircraft security door of claim 10, wherein the slanted roof panel includes a hoist ring located at a center of gravity of the aircraft security door.

26. The aircraft security door of claim 10, wherein the slanted roof panel includes a plurality of storage blocks that extend at different heights from a surface of the roof portion.

* * * * *